United States Patent [19]

Baudoux et al.

[11] 4,162,378
[45] Jul. 24, 1979

[54] DIGITAL ECHO CANCELER FOR A MODEM FOR DATA TRANSMISSION BY MEANS OF MODULATION OF A CARRIER

[75] Inventors: Jean-Pierre Baudoux, Paris; Cesar D. Macchi, Orsay, both of France

[73] Assignee: Telecommunications Radioelectriques et Telephoniques TRT, Paris, France

[21] Appl. No.: 869,508

[22] Filed: Jan. 16, 1978

[30] Foreign Application Priority Data

Jan. 17, 1977 [FR] France .............................. 77 01197
Jun. 15, 1977 [FR] France .............................. 77 18342

[51] Int. Cl.² ............................................ H04B 3/24
[52] U.S. Cl. .................................................. 179/170.2
[58] Field of Search ............... 179/170.2, 170.6, 170.8; 178/58 R

[56] References Cited

U.S. PATENT DOCUMENTS

| | | | |
|---|---|---|---|
| 3,732,410 | 5/1973 | Mackechnie | 179/170.2 |
| 3,903,377 | 9/1975 | Sato | 179/170.2 |
| 4,072,830 | 2/1978 | Gitlin et al. | 179/170.2 |
| 4,074,086 | 2/1978 | Falconer et al. | 179/170.2 |
| 4,087,654 | 5/1978 | Mueller | 179/170.2 |
| 4,117,277 | 9/1978 | van den Elzen et al. | 179/170.6 |

Primary Examiner—Kathleen H. Claffy
Assistant Examiner—Randall P. Myers
Attorney, Agent, or Firm—Thomas A. Briody; William J. Streeter

[57] ABSTRACT

Digital echo canceler for a modem for data transmission by means of phase and, possibly, also amplitude modulation of a carrier, the ratio between carrier frequency $f_o$ and modulation rate $1/T$ having the form $P/Q$, P and Q being integers.

The echo canceler receives the binary data to be transmitted for generating an echo copy signal. An echo canceler of a simple implementation is obtained in that the echo canceler comprises means responsive to each symbol configuration at each instant iT for generating at least a number depending on the amplitude allotted to the carrier at said instant iT and for applying this number to at least a given section of an assembly of adaptive digital filter whose output signals are combined for forming a digital version of the echo copy signal, the coefficients of these filters being adjusted by an assembly of adjusting circuits receiving said error signal in digital form and arranged for minimizing a predetermined function of said error signal.

18 Claims, 12 Drawing Figures

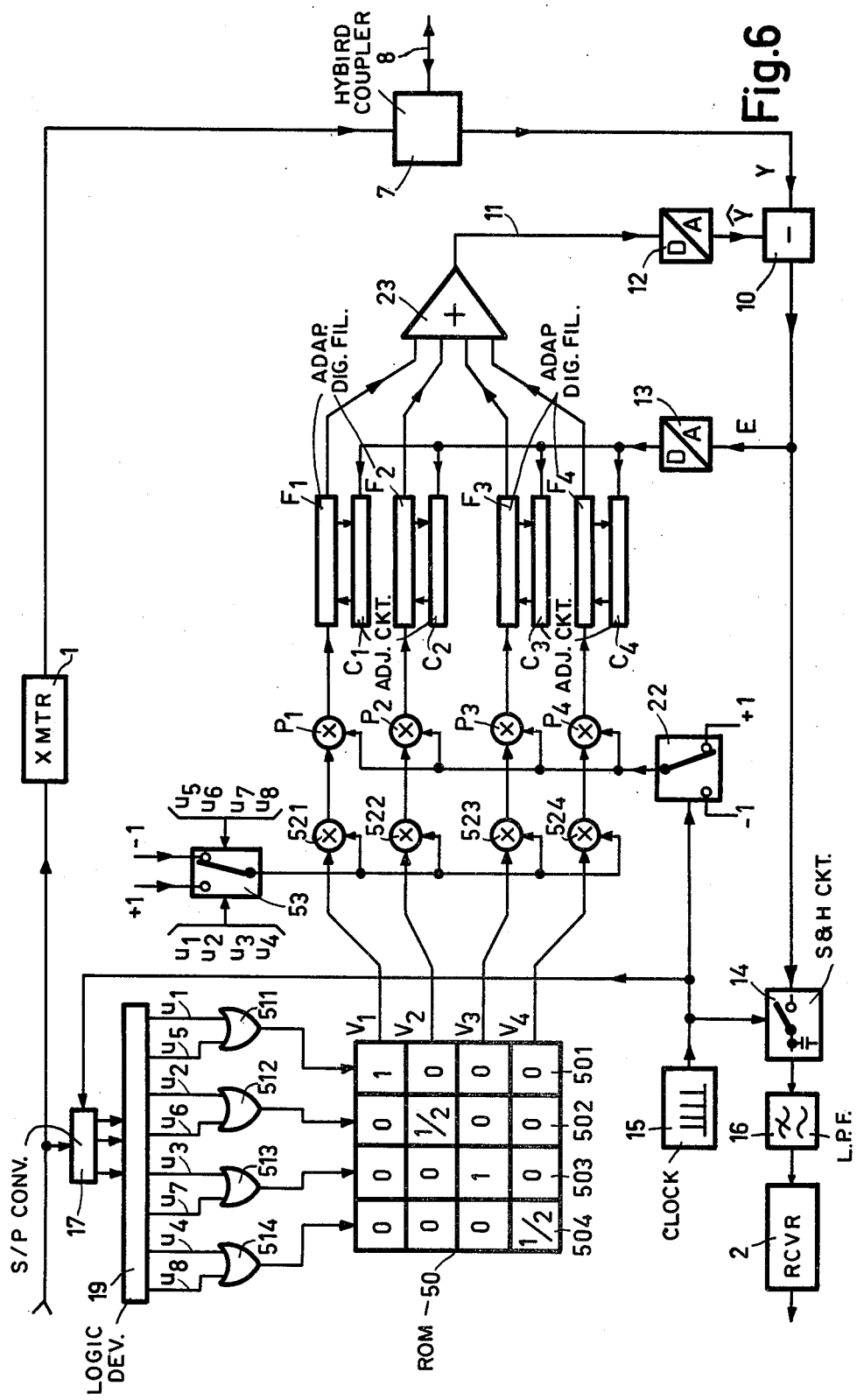

DIGITAL ECHO CANCELER FOR A MODEM FOR DATA TRANSMISSION BY MEANS OF MODULATION OF A CARRIER

The invention relates to a digital echo canceler for a modem for data transmission by means of modulation of a carrier by symbols derived from the binary data to be transmitted and occurring at instants T, where i is a variable integer and 1/T the symbol rate, the transmitter and the receiver of this modem being connected to the transmission line through a hybrid coupler, the echo canceller receiving the binary data to be transmitted and supplying an echo copy signal which is adjusted in an adaptive manner for reducing an error signal formed by the difference between the signal received from the hybrid coupler and the echo copy signal.

Such an echo canceler is used for canceling the echo signal occurring at the receive port of the hybrid coupler when the transmit port of this coupler receives a signal from the transmitter, so that simultaneous two-way transmission over a two-wire transmission circuit is possible.

In the customary version used so far for telephone transmission, such an echo canceler comprises a transversal filter for forming the echo copy signal, the transmitted signal as appearing at the transmit port of the hybrid coupler being applied to this transversal filter whose coefficients are adjusted to minimize the mean square error signal. In this prior art echo canceler, the transversal filter is complex and costly, mainly as regards the multipliers because the numbers at its input—coded telephone signal samples—are constituted by a comparatively large number of bits.

For data transmission, it is possible to realize an echo canceler having a simple and inexpensive transversal filter if the data are transmitted in the baseband, as shown in French Patent Application No. 7621499, filed on July 13, 1976.

If the data are transmitted in the passband by means of carrier modulation and if the transversal filter of the echo canceler is connected to the output of the transmitter of the modem for receiving the modulated data signal, the analog-to-digital conversion of this signal results in the same complexity and the same manufacturing costs of the transversal filter as in the case of an echo canceler for telephone signals.

A recent article by Kurt H. Mueller, entitled "A New Digital Echo Canceler for Two Wire Full-Complex Data Transmission", published in IEEE Transactions on Communications, Vol. COM-24, No. 9, September 1976, pages 956-968, describes an echo canceler in which the input of the transversal filter—having an in-phase and a quadrature-phase section—is connected to the input of the modem transmitter for receiving the unmodulated data signal, the output of the transversal filter being connected to a signal processing arrangement in which the echo copy signal is formed and also the error signal used for adjusting the filter coefficients. The actual transversal filter may then seem to be comparatively simple as regards implementation of the multipliers, this does not apply to the associated signal processing arrangement; the latter comprises a modulator which is analogous to that of the transmitter of the modem and, furthermore, an elaborate assembly of circuits for forming a suitable error signal for adjusting the coefficients of the transversal filter.

It is an object of the present invention to provide a digital echo canceler also operating on the unmodulated data signal, but based on a different concept resulting in a different structure of the echo canceler, the principal constituent part of which is formed by an adaptive filter arrangement which directly supplies the echo copy signal and which can be implemented in a simple manner.

The echo canceler according to the invention is characterized in that the echo canceler comprises means responsive to each symbol configuration at each instant iT for generating at least a number depending on the amplitude alloted to the carrier at said instant iT, and for applying this number to at least a given section of an assembly of adaptive digital filters whose output signals are combined for forming a digital version of the echo copy signal, the coefficients of these filters being adjusted by an assembly of adjusting circuits receiving said error signal in digital form and arranged for minimizing a predetermined function of said error signal.

In the case the associated data modem utilizes N-ary phase modulation of a carrier which can be combined with amplitude modulation, and the ratio between the carrier frequency $f_o$ and the symbol rate 1/T has the form P/Q, P and Q being integers, said means in the echo canceler are arranged for applying the number having the amplitude value allotted to the carrier at said instant iT to a given adaptive digital filter of said filter assembly in accordance with the phase $\theta_{ij}$ of the modulated carrier at instant iT, this phase $\theta_{ij}$ being the sum of one of the N phases $\theta_{ij}$ allotted to the carrier as a function of the data, and of the phase of the unmodulated carrier assuming Q different values within an angle of $2\pi$ radians.

In the cases used in actual practice of phase, and possibly, amplitude modulation, the N phases which can be alotted to the carrier are spaced at regular distances from one another and then the present echo canceler comprises a number of adaptive digital filters equal to the least common multiple of N and Q.

If the associated data modem is arranged so that the above-mentioned ratio P/Q has the form p/2 or (2p+1)/4, p being an integer, the number of adaptive digital filters can be reduced to N, as at each instant iT the number having the amplitude value allotted to the carrier is provided with a signal depending on the function $(-1)P^i$, and is applied to a given adaptive digital filter of said filter assembly in accordance with the phase $\phi_{ij}$ allotted to the carrier as a function of the data.

In practice the number of digital filters of the present echo canceler can once more be divided by two if—as customary—half of the phase $\theta_{ij}$ of the modulated carrier (or of the phases $\phi_{ij}$ which can be allotted to the carrier as a function of the data) differs an amount of $\pi$ radians from the other half of these phases.

So, in a first implementation of the present echo canceler, a number which, but for the sign, is equal to the amplitude allotted to the carrier is applied to each instant iT to the adaptive digital filter. In general the number of amplitudes to be allotted to the carrier is low, the frequently used phase modulation without amplitude modulation being a limit case. If different amplitudes are used, these amplitudes often have mutual ratios equal to a power of two. It is easy to see that in all these cases the multipliers required in the digital filters can be implemented in a very simple manner.

In a second implementation of the present echo canceler used in data transmission by means of phase and, possibly, also amplitude modulation, the ratio between the frequency $f_o$ of the carrier and the symbol rate 1/T having the form P/Q, the echo canceler comprises only two adaptive digital filters and means responsive to the values of the amplitude-phase pair $(A_{ir}, \theta_{ij})$ of the modulated carrier at each instant iT for generating two numbers $A_{ir}\cos\theta_{ij}$ and $A_{ir}\sin\theta_{ij}$ and applying these numbers to said two adaptive digital filters.

When the above-mentioned ratio P/Q has the form of p/2 or (2p+1)/4, p being an integer, last-mentioned two numbers to be applied at each instant iT to the two adaptive digital filters are formed in accordance with the phase $\phi_{ij}$ allotted to the carrier as a function of the data, by means of the numbers $A_{ir}\cos\phi_{ij}$ and $A_{ir}\sin\phi_{ij}$, to which a sign is allotted depending on the function $(-1)^{pi}$.

In this second embodiment the two numbers to be applied to the two adaptive digital filters are preferably stored in memories and are read from these memories under the control of the values of the amplitude-phase pair $(A_{ir}, \theta_{ij})$ or $(A_{ir}, \phi_{ij})$ at each instant iT.

The adaptive digital filters used in the present echo canceler can be realized in a simple manner. In a first embodiment each filter comprises means for forming a sample $$g_k(n) = \sum_{i=1}^{L} Z_i(n) \cdot G_{ik}(n)$$

at each sampling instant $$t_{nk} = nT + kT/q$$

n being an integer between $-\infty$ and $+\infty$ and k being an integer between O and (q−1), $Z_i(n)$ being the L numbers applied at instants (n−i)T to the filter, $G_{ik}(n)$ the L filter coefficients corresponding to samples of the impulse response at the instants (n−i)T+kT/q, the numbers $Z_i(n)$ and the coefficients $G_{ik}(n)$ being obtained at the output of the respective memories during a computing interval T/q allotted to said instant $t_{nk}$.

In the second embodiment of the present echo canceler with two digital filters, the numbers $Z_i(n)$ to be processed by the filters may often be "complicated" because they depend on sine and cosine functions, so that the multiplications to be performed with these numbers in the filters are complicated. In some cases this also applies to the first embodiment of the present echo canceler. An advantageous embodiment of the adaptive digital filters for the present echo canceler, by means of which it is possible to reduce the number of complicated multiplications to be performed in each unit of time to a minimum, can yet be obtained. To this end use is made of the fact that the absolute value of the numbers to be processed in the filter can assume a limited number of different values only. In this embodiment each adaptive digital filter comprises the following elements:

a circuit for coding the numbers $Z_i(n)$ for generating their sign and their absolute value in coded form, a circuit controlled by the generated sign of the numbers $Z_i(n)$ for changing the sign of the filter coefficients $G_{ik}(n)$ in case the signs of $Z_i(n)$ and $G_{ik}(n)$ are different.

switching means controlled by the absolute values of the numbers $Z_i(n)$ generated in coded form for applying the filter coefficients $G_{ik}(n)$ thus obtained with the associated sign to a given accumulator of an assembly of accumulators which each individually correspond to a given absolute value of the numbers $Z_i(n)$, said accumulator assembly being reset to zero at the beginning of each computing interval T/q, multiplying circuits for forming at the end of each computing interval T/q a product of the number in each accumulator with the absolute value associated with this accumulator, an adder circuit for combining said products for forming the required sample $q_k(n)$.

If the digital filters of the echo canceler are implemented in this manner, it is advantageous if these filters jointly utilize the same accumulator assembly, the same multiplying circuits for forming in each a accumulator at the end of each computing interval T/q the product of the number with the absolute value associated with this accumulator, and the same adder circuit for combining said products for forming a sample of the echo copy signal.

Embodiments of the echo canceler according to the invention and their advantages will now be further explained with reference to the drawings, in which FIG. 1 is a block diagram of a first embodiment of an echo canceler according to the invention used for the phase and amplitude modulation of a carrier in the case in which the ratio $f_o/(1/T)$ has the form p/2 or (2p+1)/4;

FIG. 6 is a block diagram derived from FIG. 1 and used for octonary phase modulation of a carrier with two amplitude levels;

Figure 1:
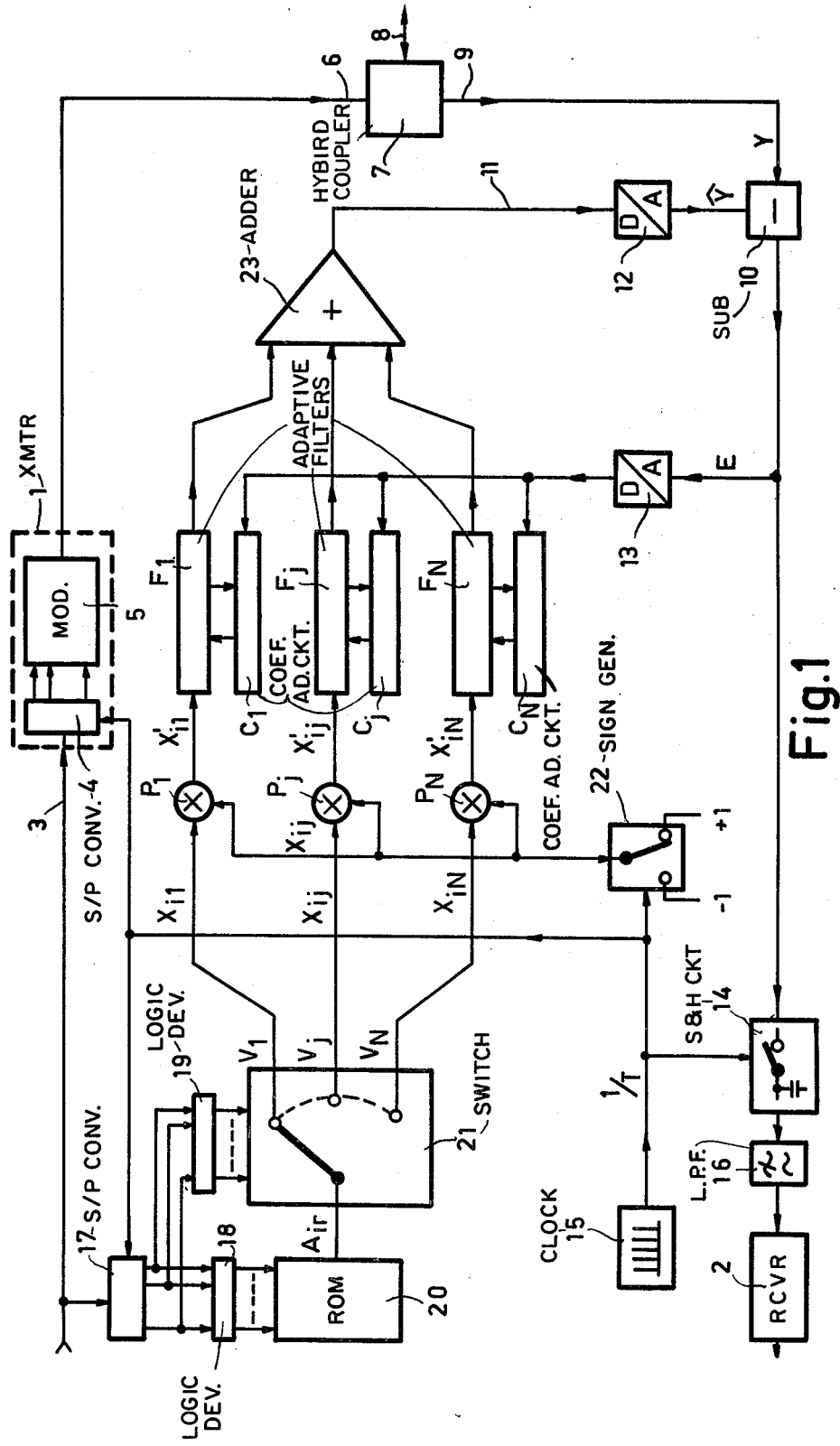
FIG. 1 shows a first embodiment of an echo canceler according to the invention together with a transmitter 1 and a receiver 2 of a modem for data transmission by means of modulation of a carrier.

The binary data to be transmitted are applied through a lead 3 to a series-to-parallel converter 4 in transmitter 1 and this converter 4 generates, with a rate 1/T derived from a clock generator 15, m-bit numbers which result from a grouping of m successive data bits. These m-bit numbers, which will be called symbols hereinafter, may assume $2^m$ configurations and are applied at instants iT (i being an integer) to a modulator 5 in which a carrier is modulated in the rhythm 1/T in accordance with the possible symbol configurations. In the case of binary modulation (m=1) converter 4 is not required and the data are applied directly to modulator 5. To define the concepts it is assumed hereafter that, except where the contrary is stated, the phase of the carrier or the phase and the amplitude of the carrier is modulated in modulator 5.

The output of transmitter 1 is connected to a transmit port 6 of a hybrid coupler 7. This hybrid coupler ensures that the signals originating from transmitter 1 are applied to a transmission line 8 and that the signals originating from transmission line 8 are applied to receiver 2. But in practice it is difficult to have a hybrid coupler perform this function perfectly and, when transmitter 1 transmits, a parasitic signal occurs at a receive port 9 of hybrid coupler 7 which signal reaches receiver 2. This parasitic signal may be due to imperfections of hybrid coupler 7, which thereby transmits a portion of the signal applied to its transmit port 6 to its receive port 9. This parasitic signal may also be the result of impedance discontinuities in transmission line 8 which, during a transmission of transmitter 1, produce an echo signal which is found back at receive port 9. Irrespective of its origin this parasitic signal will be called echo signal hereinafter.

To cancel an echo signal y at receive port 9, the echo canceler comprises a difference circuit 10, one input of which receives this echo signal $\hat{y}$ and the other input an echo copy signal y. This difference circuit 10 supplies a difference signal $E = y - \hat{y}$, which will be called error signal hereinafter. The actual function to be performed in an echo canceler consists of forming in an adaptive manner such an echo copy signal $\hat{y}$ that at the output of the difference circuit 10 a signal is produced, in which the echo signal is canceled and which is zero when only transmitter 1 transmits.

The conventional technique for performing this function consists of the use of an adaptive digital filter, not shown in FIG. 1, which receives the digital version of the signal supplied by transmitter 1 and supplies to a connecting lead 11 the digital version of the echo copy signal which is converted into an analog signal by means of a digital-to-analog converter 12, the coefficients of this filter being controlled by means of the error signal E, obtained in digital form by means of an analog-to-digital converter 13, in such a way that the mean-square value of the error signal E is at a minimum. The coefficients of this filter are adjusted at discrete instants and the output signal of difference circuit 10 is sampled at a rate 1/T by means of a sample-and-hold circuit 14 controlled by clock generator 15. The output of sample-and-hold circuit 14 is connected to a lowpass filter 16 which supplies an analog signal to receiver 2. In this conventional technique the multiplications to be performed in this digital filter are very expensive as the modulated signal supplied to the input of this filter must be coded into a comparatively large number of bits (for example 10 to 12 bits) and as the numbers resulting from this coding must be multiplied by filter coefficients of, for example, 18 bits. As the number of multiplications to be performed each second is often large in conjunction with the duration of the echo, this technique results in a very complex and expensive echo canceler.

In the above-mentioned article by Mueller it has been proposed to connect the input of the adaptive digital filter (having an in-phase path and a quadrature-phase path) directly to the input of transmitter 1 for receiving the binary data signal, whereas the output signal of this filter is processed by a comparatively intricate arrangement for supplying the error signal controlling the filter coefficients.

Although the binary data signal to be transmitted is also used as input signal, the echo canceler according to the present invention is based on a different concept resulting in an entirely different structure and in circuits which are easy to realize, especially as regards the multiplying circuits of the adaptive filters.

The echo canceler according to the invention, shown in FIG. 1 will now be described by way of non-limitative example for the case that phase and amplitude modulation are used in transmitter 1, in general a phase and an amplitude being allotted to the carrier at each instant iT as a function of the symbol configuration applied at that instant to modulator 5. As is always the case in practice, the ratio $f_o/(1/T)$ between the carrier frequency $f_o$ and the symbol rate 1/T has the form P/Q, P and Q being integers. In the case of the echo canceler shown in FIG. 1, as well as in all the embodiments described herein and derived from FIG. 1, the frequently occurring case is considered in which the ratio P/Q has the special form p/2 or (2p+1)/4, p being an integer. Thereafter other embodiments will be considered which relate to the case in which the ratio $f_o/(1/T)$ has the general form P/Q, P and Q being any integer.

In the remaining part of this description, the possible phases of the carrier are indicated by $\phi_j$, j being a variable integer between 1 and N; the possible amplitudes of the carrier are indicated by $A_r$, r being a variable integer between 1 and M. In general, a phase $\phi_{ij}$, chosen from the N possible phases, as well as an amplitude $A_{ir}$, chosen from the M possible amplitudes, are allotted to the carrier at each instant iT. The number M of the possible amplitudes $A_r$ is usually very small and, for example, equal to 1 in the case of phase modulation without amplitude modulation.

In the echo canceler of FIG. 1 the binary data to be transmitted are applied to a series-to-parallel converter 17 which, at instants iT corresponding to the symbol rate 1/T, supplies the same m-bit numbers (symbols) as those supplied by the series-to-parallel converter 4 in transmitter 1. These symbols are simultaneously applied to a logic device 18 which determines the amplitude allotted to the carrier by generating a logic "1" at one of its M outputs, and to a logic device 19 which determines the phase allotted to the carrier by generating a logic "1" at one of its N outputs. The M possible amplitudes $A_r$ of the carrier are entered into a ROM-store 20 and, in response to a logic "1" which appears at an instant iT at a given output of the logic device 18, the corresponding amplitude $A_{ir}$ is read from store 20 and applied to the input of a commutator circuit. The latter circuit is shown as a switch 21 having N positions to which N outputs $v_j$ correspond. In response to a logic "1" appearing at each instant iT at a given output of logic device 19, switch 21 moves to a corresponding position so that the amplitude $A_{ir}$ appears at a given output $v_j$ of switch 21. At each instant iT, N numbers appear at the N outputs $v_j$, these numbers being denominated $X_{ij}$. Only one of these numbers $X_{ij}$ is not equal to zero, but equal to the amplitude $A_{ir}$ allotted to the carrier, this number unequal to zero appearing at an output corresponding to the phase of the carrier.

In the example considered in FIG. 1 it is assumed that, as indicated above already, the ratio $f_o/(1/T)$ between the carrier frequency $f_o$ and the symbol rate $1/T$ is equal to $p/2$ or $(2p+1)/4$, that is to say that $2f_o/(1/T)$ is equal to p or p/½, p being an integer. A sign determined by the function $(-1)^{pi}$ is then generally allotted to the numbers $X_{ij}$ which are unequal to zero, each value of the variable i characterizing an instant iT. It is obvious that in the case where p is even, $(-1)^{pi}$ is always positive and that no special measure need be taken to provide the numbers $X_{ij}$ unequal to zero which are positive because they represent the amplitudes of the carrier with a sign. In the case where p is odd, the sign of $(-1)^{pi}$ is changed depending on whether i is even or odd. The echo canceler of FIG. 1 illustrates the case where p is odd.

So the numbers $X_{ij}$ unequal to zero are therefore provided with a sign by means of multipliers $P_j$, one input of which is connected to the outputs $v_j$ of switch 21, the other input receiving the numbers $+1$ or $-1$ originating from a generator 22 for the function $(-1)^{pi}$. This generator 22 consists of a two-position switch to which the numbers $+1$ and $-1$ respectively are applied, this switch being controlled by pulses at a rate $1/T$ from clock generator 15 to assume alternately one or the other position and, consequently, to supply alternately the numbers $+1$ and $-1$.

Numbers $X'_{ij}$ which are given by $X'_j = (-1)^{pi} X_{ij}$ are then applied to an assembly of adaptive digital filters $F_j$. For the case shown in FIG. 1, where p is odd, these numbers $X'_{ij}$ are obtained at the outputs of the multipliers $P_j$. In the case where p is even the numbers $X'_{ij}$ are directly obtained at the outputs $v_j$ of switch 21. So from the preceding it appears that at each instant iT only one of these filters $F_j$ receives a number $X'_{ij}$ which is not equal to zero.

The output signals of the adaptive digital filters $F_j$ are combined in an adder 23 which supplies at its outputs the echo copy signal in digital form, which is applied to lead 11.

The filters $F_j$ comprise circuits $C_j$ for adjusting their coefficients, these circuits receiving the digital version of the error signal E from analog-to-digital converter 13 and being arranged for minimizing a predetermined function of this error signal, for example its mean square value.

The structure and the operation of the above-described echo canceler according to the invention are based on recognitions which will be explained by means of the block diagrams of FIG. 2 and FIG. 3. Certain elements of FIG. 1 have been included in these block diagrams, which elements have then been given the same reference numerals, whereas for simplicity's sake other non-essential elements have been omitted.

Figure 2:
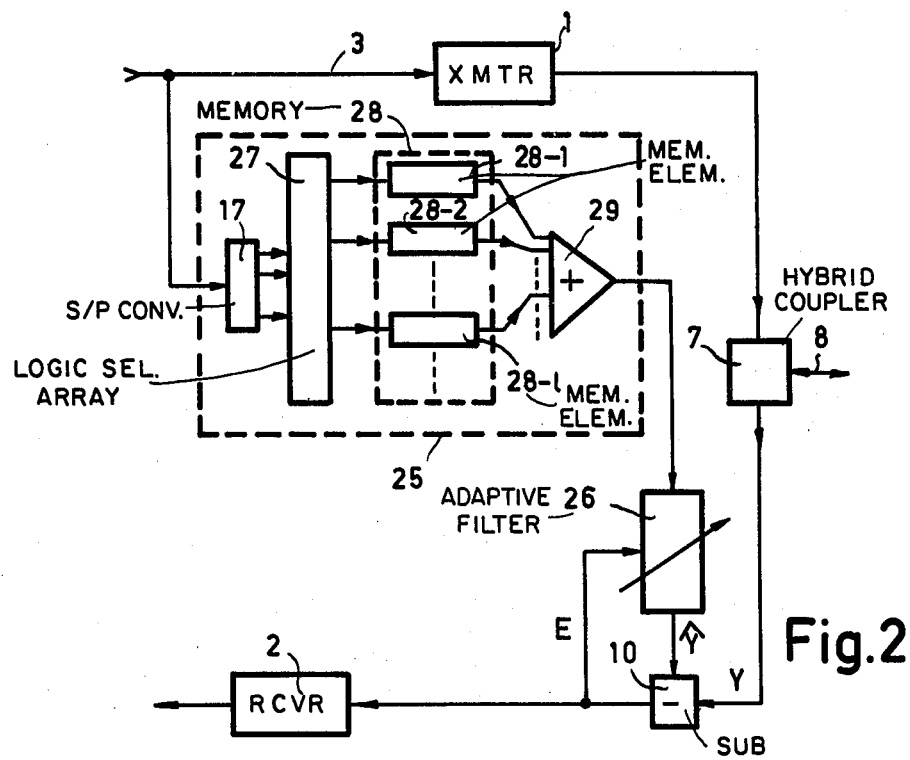
FIG. 2 is a possible block diagram of an echo canceler for explaining the block diagram of an echo canceler according to the invention as shown in a general form in FIG. 3.

It is obvious that for forming an echo copy signal $\hat{y}$ from the binary data signal to be transmitted it is necessary, as shown in FIG. 2, that carrier modulation must be performed in a block 25, this modulation corresponding to the modulation in transmitter 1, followed, in a block 26 by a filtering process controlled in an adaptive manner by the error signal E, so that the mean square value of this error signal is minimized. This method of signal processing is only useful for understanding the basic idea of the invention but is, in itself, of no practical use whatsoever as, just like a prior art echo canceler in which the adaptive filtering action is performed on the modulated signal supplied by transmitter 1, it will be very difficult to realize the adaptive filtering action to be performed in block 26.

An article by Choquet and Nussbaumer entitled "Microcoded Modem Transmitters", published in the periodical I.B.M. J. Res. Develop., July 1974, pages 338–351, describes in particular a digital carrier modulation method which is suitable for any type of modulation and which consists of deriving prdetermined elementary digital signals corresponding to the modulation type from a store and forming the sum of these elementary signals. Each elementary signal is a sequence of coded samples which may be considered as originating from sampling the impulse response of a fixed filter. The duration and the number of these impulse responses depends on the modulation parameters. This modulation process is performed in FIG. 2 by means of a logic selection arrangement 27 which in response to the various symbol configurations supplied by series-to-parallel converter 17, derives at each instant iT at least one elementary signal stored in an elementary memory from a memory 28 constituted by elementary memories 28-1, 28-2, ... 28-1. At each instant iT adder 29 then supplies the sum of the samples supplied by the elementary memories.

The basic idea of the invention is that the filtering process performed in block 26 of FIG. 2 on the sum signal of the elementary signals, can be performed equally well by replacing the elementary memories 28-1, 28-2, ... etc. which each supply coded samples of a fixed impulse response, by adaptive digital filters, which receive signals to be described later on for each type of modulation and whose variable coefficients are all controlled by the same error signal E to minimize the mean square value of this error signals.

Figure 3:
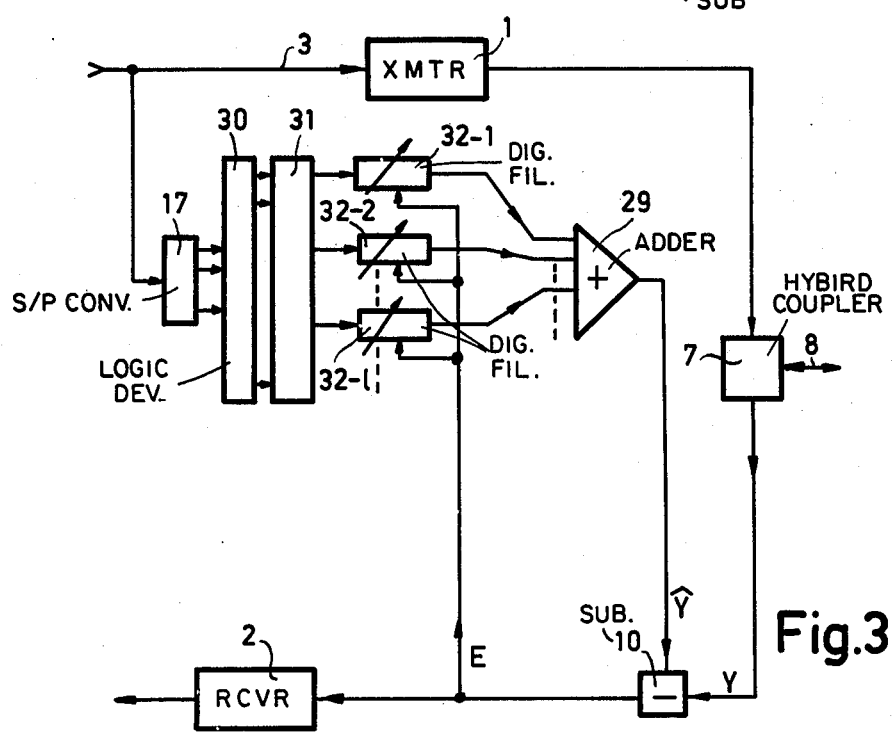

In accordance with this basic idea, the general form of the echo canceler according to the invention is obtained which is shown in FIG. 3. A logic device 30 detects the various symbol configurations supplied by series-to-parallel converter 17 and in response to the detected configuration at an instant iT this logic device 30 generates numbers which depend on the type of modulation and the modulation parameters. These numbers, some of which may be equal to zero, are applied to adaptive digital filters 32-1, 32-2, ... 32-1, .... The variable coefficients of these filters are all controlled by the same error signal E to minimize the mean square value of this error signal. Adder 29 supplies the echo copy signal $\hat{y}$ as the sum of the output signals of these filters. As will be proved hereafter, the generation of the numbers to be applied to the input of the adaptive filters is very simple in practical modulation cases and as these numbers can usually be represented by a small number of bits the implementation of the adaptive filters is also simple.

Transforming the block diagram of FIG. 2 in that of FIG. 3 can be represented by the following formula:

$$G_1(t) = M(t) * H_1(t) \qquad (1)$$

In this formula:
$G_1(t)$ is the variable impulse response of an adaptive filter such as 32-1 in FIG. 3;
$H_1(t)$ is the fixed impulse response whose samples are supplied by the elementary memory 28-1 in FIG. 2;
$M(t)$ is the variable impulse response of the adaptive filter 26 in FIG. 2, that is to say the impulse response of the echo path when echo compensation has been realized;

* indicates the convolution process.

The echo canceler of FIG. 1 is an illustration of the general block diagram of the echo canceler of FIG. 3, applied to a modem using phase and amplitude modulation.

If the considerations are restricted for the time being to the case in which the ratio $2f_0/(1/T)$ is an integer p, it can be proved by means of the above-mentioned article by Choquet and Nussbaumer that a phase and amplitude modulated carrier signal f(t) can be obtained by performing the various computations in the following expression:

$$f(t) = \sum_{j=1}^{N} \sum_{i=-\infty}^{+\infty} (-1)^{pi} \cdot X_{ij}[e_1(t-iT)\cos\phi_{ij} - e_2(t-iT)\sin\phi_{ij}] \quad (2)$$

In this expression $\phi_{ij}$ is one of the N-phases are alotted to the carrier at an instant iT; $X_{ij}$ has the above-mentioned meaning, that is to say, that at an instant iT and for N values of j $X_{ij}$ is a set of N numbers of which only one is not equal to zero but equal to an amplitude $A_{ir}$ of the carrier; $e_1(t)$ and $e_2(t)$ are given impulse responses which need not be described in greater detail here and which, after having been multiplied by $\cos\phi_{ij}$ and $\sin\phi_{ij}$ can be combined for forming an impulse response $H_{ij}(t)$:

$$H_{ij}(t) = e_1(t)\cos\phi_{ij} - e_2(t)\sin\phi_{ij} \quad (3)$$

It is obvious that a given impulse response $H_{ij}(t)$ corresponds to each of the N possible values of $\phi_{ij}$.

Using formula (3) and by introducing:

$$X'_{ij} = (-1)^{pi} X_{ij} \quad (4)$$

the expression (2) can be written as:

$$f(t) = \sum_{j=1}^{N} \sum_{i=-\infty}^{+\infty} X'_{ij} \cdot H_{ij}(t-iT) \quad (5)$$

It will be easy to see for those skilled in the art that the computations defined in this expression (5) for obtaining a phase and amplitude m modulated carrier signal, can be performed by forming the sum of the output signals of N filters with fixed impulse responses $H_{ij}(t)$, each characterized by a value of j, these N filters receiving the N numbers $X'_{ij}$ at each instant iT.

From the basic concept of the invention, explained with reference to FIG. 3 it then follows that the echo copy signal ŷ(t) in the echo canceler is supplied in accordance with the invention by an expression resembling expression (5), but in which the fixed impulse response $H_{ij}(t)$ of the fixed filters have been replaced by variable impulse responses $G_{ij}(t)$ of adaptive filters controlled by the error signal E(t).

In the same manner as in formula (1) it can then be written:

$$G_{ij}(t) = M(t) * H_{ij}(t) \quad (6)$$

The echo copy signal is then given by the expression:

$$\hat{y}(t) = \sum_{j=1}^{N} \sum_{i=-\infty}^{+\infty} X'_{ij} \cdot G_{ij}(t-iT) \quad (7)$$

In the echo canceler of FIG. 1 the N adaptive filters $F_j$ have the respective impulse response $G_{ij}(t)$ which are adjusted in the manner to be described hereinafter. Each of the N filters $F_j$ computes the function $g_j(t)$:

$$g_j(t) = \sum_{i=-\infty}^{+\infty} X'_{ij} \cdot G_{ij}(t-iT) \quad (8)$$

When non-recursive filters are used, time-limited impulse responses being assumed, the number of values of i is, of course, finite. At each instant iT the filters $F_j$ receive the N numbers $X'_{ij}$ which result from the numbers obtained at the outputs $v_j$ of switch 21 and are provided with a sign determined by the position of switch 22. At a given instant iT only one single filter $F_j$ receives a number $X'_{ij}$ which is unequal to zero. Adder 23 supplies the echo copy signal by calculating the sum:

$$\hat{y}(t) = \sum_{j=1}^{N} g_j(t) \quad (9)$$

An embodiment in digital form of an adaptive filter $F_j$ comprising an adjusting circuit $C_j$ for the coefficients will now be described.

The function $G_j(t)$ defined by formula (8) is calculated at discrete sampling instants, the frequency of which must be at least equal to twice the highest frequency of the echo signal in order to satisfy the Shannon theorem. This condition can be satisfied by taking a given multiple of 1/T as the sampling rate. for example q/T, where q is an integer exceeding unity. The sampling instants which are separated from one another by an interval T/q are fully defined by the expression:

$$t_{nk} = nT + kT/q \quad (10)$$

where $t_{nk}$ is a denotation of the sampling instants indicating that they are dependent of two variable integers n and k, n varying between $-\infty$ and $+\infty$, and k being limited to the values between 0 and (q−1).

The computations in a filter $F_j$ as they are defined by formula (8) must be performed at different instants $t_{nk}$ defined by formula (10): for each value of n the computations must be performed q times when k is successively given the values 0, 1, ..., p, ..., (q−1); these computations are:

$$k = 0 \quad g_j[nT] = \sum_{i=-\infty}^{+\infty} X'_{ij} \cdot G_{ij}[nT-iT] \quad (11)$$

$$k = 1 \quad g_j[nT+T/q] = \sum_{i=-\infty}^{+\infty} X'_{ij} \cdot G_{ij}[nT-iT+T/q]$$

$$\vdots \quad \vdots$$

$$k = p \quad g_j[nT+pT/q] = \sum_{i=-\infty}^{+\infty} X'_{ij} \cdot G_{ij}[nT-iT+pT/q]$$

$$\vdots \quad \vdots$$

-continued
$$k = q-1 \; g_j[nT+(q-1)T/q] = \sum_{i=-\infty}^{+\infty} X'_{ij} \cdot G_{ij}[nT-iT+(q-1)T/q]$$

To simplify the notation the following is introduced:

$$g_j(nT-kT/q) = g_{jk}(n) \quad (12)$$

$$G_{ij}(nT-iT+kT/q) = G_{ijk}(n)$$

If, moreover, the fact that in practice the summing over i is performed with a finite number L of values i is taken into account, the formulas (11) can be rewritten as:

$$g_{jo}(n) = \sum_{i=1}^{L} X'_{ij}(n) \cdot G_{ijo}(n) \quad (13)$$

$$g_{j1}(n) = \sum_{i=1}^{L} X'_{ij}(n) \cdot G_{ij1}(n)$$

.
.
.

$$g_{jp}(n) = \sum_{i=1}^{L} X'_{ij}(n) \cdot G_{ijp}(n)$$

.
.
.

$$g_{j(q-1)}(n) = \sum_{i=1}^{L} X'_{ij}(n) \cdot G_{ij(q-1)}(n)$$

In these formulas (13) the numbers $X'_{ij}$ entering the filter are denoted by $X'_{ij}(n)$. Their value must actually be taken at the sampling instants $t_{nk}$ defined by formula (10); however, this value changes only at the instants nT and therefore only depends on $n:X'_{ij}(n)$ in these formulas means $X'_j(nT-iT)$.

These formulas (13) show that a filter $F_j$ can be considered as being composed of q elementary filters $f_o, f_1, \ldots f_p, \ldots, f_{q-1}$, these filters operating successively at instants separated by the time interval T/q and using during a time interval located between nT and $nT+(q-1)T/q$ the same numbers $X'_{ij}(n)$:

at the instant nT the elementary filter $f_o$ calculates the value $g_{jo}(n)$ during an interval T/q by means of the L coefficients $g_{ijo}(n)$, i being situated between 1 and L.

at the instant nT+T/q the elementary filter $f_1$ calculates the value $g_{j1}(n)$ using the L coefficients $G_{ij1}(n)$.

at the instant nT+pT/q the elementary filter $f_p$ calculates the value $g_{jp}(n)$ using the L coefficients $G_{ijp}(n)$.

at the instant nT+(q-1)T/q the elementary filter $f_{q-1}$ calculates the value $g_{j(q-1)}(n)$ using the L coefficients $G_{ij(q-1)}(n)$.

It is therefore obvious that a filter $F_j$ uses a total of L.q coefficients.

During the next time interval of (n+q)T+(q-1)T/q the q elementary filters $f_o, f_1, \ldots f_p, \ldots f_{q-1}$ will operate in the same manner with the numbers $X'_{ij}(n+1)$, using the respective coefficients: $G_{ijo}(n+1), G_{ij1}(n+1), \ldots G_{ijp}(n+1), \ldots G_{ij(q-1)}(n+1)$.

The coefficients of the elementary filters which together constitute a filter $F_j$ are adjusted by means of the corresponding adjusting circuit $C_j$ so that the means square value of the error signal E(t) is reduced to a minimum. This error signal is sampled in analog-to-digital converter 13 at the instants $t_{nk}$ defined in formula (10), at which instants the error signal assumes the values indicated by $E_k(n)$. The use of the algorithm of the gradient to reduce the mean square value of the error signal to a minimum results in an iterative adjustment of the coefficients in accordance with the relations:

$$G_{ijo}(n+1) = G_{ijo}(n) + \mu \cdot E_o(n) \cdot X'_{ij}(n) \quad (14)$$

$$G_{ij1}(n+1) = G_{ij1}(n) + \mu \cdot E_1(n) \cdot X'_{ij}(n)$$

.
.

$$G_{ijp}(n+1) = G_{ijp}(n) + \mu \cdot E_p(n) \cdot X'_{ij}(n)$$

.
.

$$G_{ij(q-1)}(n+1) = G_{ij(q-1)}(n) + \mu \cdot E_{q-1}(n) \cdot X'_{ij}(n)$$

In these formulas (14) $\mu$ is a coefficient smaller than 1 and has in general a very small value. Each of these formulas must be used for each value i between 1 and L.

Finally the formulas (13) and (14) define all computations to be performed in a filter $F_j$ and its associated adjusting circuit $C_j$. In practice the multiplications in these computations are simple to perform, for one of the factors in these multiplications, $X'_{ij}(n)$, comprises a limited number of bits for all usual modulation cases. For example, in the case of N-ary phase modulation with one single amplitude level ($A_j=1$, irrespective of j), the numbers $X'_{ij}(n)$ require only 2 bits for representing the three possible values (the value zero and the amplitude $A_j$ provided with a + or − sign).

It is easy to see that for N-ary phase modulation with 2, 4 or 8 amplitude levels with mutual ratios equal to ½, ¼, ... the numbers $X'_{ij}(n)$ need only have 3 bits, 4 bits and 5 bits, respectively. Attention should also be paid to the fact that in the formulas (14) the multiplications by the coefficient $\mu$ are practically gratis, if $\mu$ is chosen equal to the inverse of a power of two. Finally, in the formulas (14) the numbers which, as $E_p(n)$, represent the error signal, contain a limited number of bits and these numbers may even contain one single bit only representing the sign of the error signal.

Figure 4:
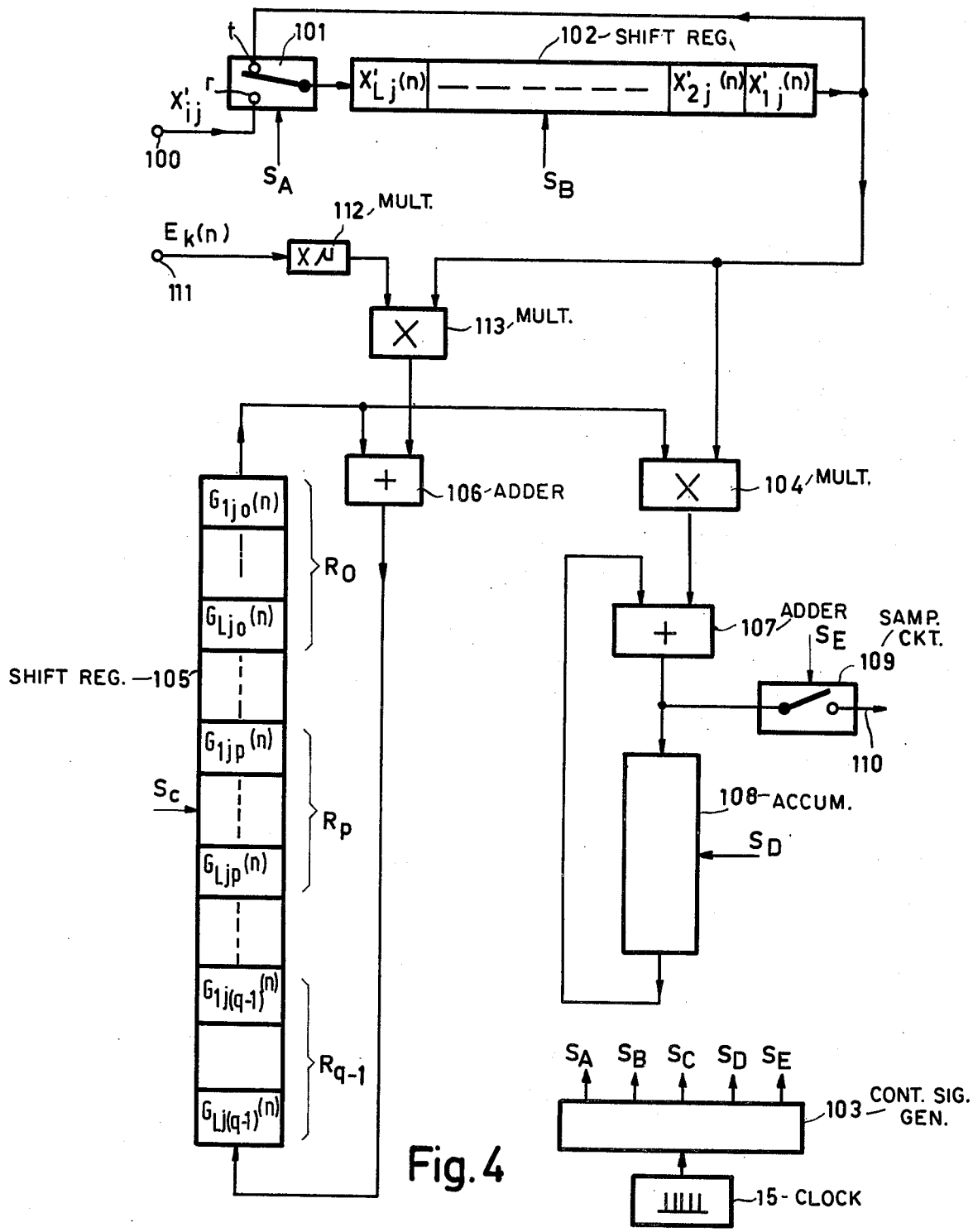
FIG. 4 is a block diagram of an embodiment of an adaptive digital filter.

FIG. 4 shows an embodiment of a filter $F_j$ which is combined with an adjusting circuit $C_j$, in practice these two arrangements overlapping one another to a considerable extent. The computations to be performed, given in formulas (13) and (14), are performed serially in this embodiment.

The numbers $X'_{ij}$ to be processed by the filter $F_j$ appear at an input 100 and are applied through a two-position switch 101 in a position r to a shift register 102. Switch 101 is controlled by a control signal $S_A$ so that it is in the position r at the instants nT for a period of time negligible relative to T, and in a position t for the rest of the time. If switch 101 is in the position t, the output of shift register 102 is connected to its input and this occurs practically during the entire period T separating two successive instants nT. The control signal $S_A$, and likewise the other control signals which will be defined hereinafter, are derived from clock pulse generator 15 by means of a control signal generator 103.

Shift register 102 comprises L elements for storing L numbers $X'_{ij}(n)$, i being situated between 1 and L. If switch 101 is in position t, the numbers present in register 102 are shifted by means of shift pulses together forming a control signal $S_B$. The frequency of these pulses is $L \cdot q/T$ so that during a period T separating two successive instants nT the sequence of L numbers $X'_{ij}(n)$ appears for a total of q times at the output of register 102, this sequence having the duration T/q.

The output of shift register 102 is connected to an input of a multiplier 104 whose other input is connected to the output of a shift register 105. This shift register 105 comprises Lq elements for storing the Lq filter coefficients $G_{ijk}(n)$ occurring in the formula (13). A first group $R_o$ of L elements comprises the L coefficients $G_{1jo}(n)$ to $G_{Ljo}(n)$ occurring in the first formula of the set of formulas (13) and serve for computing $g_{jo}(n)$. The group $R_p$ of L elements comprises the L coefficients $G_{1jp}(n)$ to $G_{Ljp}(n)$ which are used for computing $g_{jp}(n)$. Finally, the last group $R_{q-1}$ of L elements comprises the L coefficients $G_{1j(q-1)}(n)$ to $G_{Lj(q-1)}(n)$ which are used for computing $g_{j(q-1)}(n)$. The output of shift register 105 is coupled to its input through an adder 106 which, as will appear below, is used for adjusting the coefficients. The coefficients stored in register 105 are shifted by means of shift pulses which together form a control signal $S_C$. The frequency of the pulses of this control signal $S_C$ is equal to that of the pulses of control signal $S_B$, that is to say $Lq/T$.

If the control signals $S_B$ and $S_C$ are synchronized in a suitable manner, it is obvious that the two corresponding terms of all products in the formulas (13) appear successively during a period T at the inputs of multiplier 104. These products themselves appear at the outputs of multiplier 104 at a rate $Lq/T$ and are applied to an input of an adder 107. The output of this adder 107 is connected to an accummulator 108 whose output is connected to the other input of this adder 107. The contents of accumulator 108 is set to a value zero by the pulses of a control signal $S_D$ at a rate q/T. The output signal of adder 107 is sampled by a sampling circuit 109 which is controlled by the pulses of a control signal $S_E$ at a rate q/T. If the pulses of the control signals $S_D$ and $S_E$ occur at suitably chosen instants, it is obvious that during a period T there appear at an output 110 of sampling circuit 109 successively the q sums occurring in the formulas (13), that is to say the required numbers $g_{jo}(n)$ to $g_{j(q-1)}(n)$. This output 110 constitutes the output of the filter $F_j$.

For adjusting the L·q filter coefficients stored in shift register 105, in accordance with the formulas (14), use is made of the sampled and coded error signals appearing in the form of the numbers $E_k(n)$ at an input 111 and originating from analog-to-digital converter 13 in FIG. 1. During a period T between two successive instants nT the q numbers $E_o(n)$ to $E_{q-1}(n)$ occurring in the formulas (14) appear at a rate q/T. These numbers which are multiplied in a multiplier 112 by the constant coefficient $\mu$, are applied to an input of a multiplier 113 whose other input is connected to the output of shift register 102. As this shift register 102 supplies the sequence of L numbers $X'_{ij}(n)$ a total of q times during the above period T, it is obvious that all products occurring in the formulas (14) successively appear at the output of multiplier 113 in the following sequence at a rate $Lq/T$:

$- \mu \cdot E_o(n) \cdot X'_{ij}(n)$   $i = 1, 2, \ldots, L$
$- \mu \cdot E_1(n) \cdot X'_{ij}(n)$   $i = 1, 2, \ldots, L$ $\vdots$ -continued $- \mu \cdot E_p(n) \cdot X'_{ij}(n)$   $i = 1, 2, \ldots, L$ $\vdots$ $- \mu \cdot E_{q-1}(n) \cdot X'_{ij}(n)$   $i = 1, 2, \ldots, L$ These products form the modifying terms of the coefficients to be added to the filter coefficients for a given iteration step n to obtain the filter coefficients for the next iteration step (n+1). To obtain the modified filter coefficients, the modifying terms of the coefficients supplied by multiplier 113 are applied to an input of adder 106 whose other input is connected to the output of shift register 105. As the filter coefficients at the output of this shift register 101 occur at the rate $Lq/T$ in the order shown in FIG. 4 and as the modifying terms for the filter coefficients are supplied at the same rate in the above order, it is obvious that during a period T the Lq filter coefficients modified in accordance with the formulas (14) successively appear at the output of adder 106. These modified filter coefficients are applied to the input of shift register 105 and are available at the output of this register after a period of time T.

In the description of the first embodiment of the present echo canceler as shown in FIG. 1 the most general case of phase modulation was considered in which the N possible phases $\phi_j$ which can be allotted to the carrier are not in any mutual relation to one another. If now, as assumed, the ratio $2f_o/(1/T)$ is equal to p, the present echo canceler comprises N filters $F_j$ in this first embodiment. Hereafter it will appear that this also applies if this ratio $2f_o/(1/T)$ is equal to (p+1/2). In the usual cases of N-ary phase modulation of a carrier this number of filters $F_j$ can actually be reduced to N/2, still assuming that $2f_o/(1/T)=p$ or (p+1/2). In practice the N phases $\phi_j$ have such a relation that N/2 phases, corresponding to j=1 to n/2, differ by $\pi$ radians from N/2 other phases, corresponding to j=N/2+1 to N, respectively. As regards to N impulse responses $H_{ij}(t)$ defined by the expression (3), it can be derived therefrom that N/2 impulse responses, corresponding with j=1 to N/2 are equal in absolute value to the N/2 other impulse responses, corresponding to j=N/2+1 to N, but with an opposite sign. In accordance with formula (5) it follows therefrom that a phase and amplitude modulated carrier signal can be obtained by means of N/2 filters having impulse responses $H_{ij}(t)$, where j=1 to N/2, by applying the numbers $X'_{ij}$ to the input of these filters for j=1 to N/2 and the numbers $-X'_{ij}$ for j=N/2+1 to N.

The same result can be used in the echo canceler according to FIG. 1. In this case not more than N/2 adaptive filters having variable impulse responses $G_{ij}(t)$ are required by applying to these filters the numbers $X'_{ij}$ for j=1 to N/2 and the numbers $-X'_{ij}$ for j=N/2+1 to N.

Figure 5:
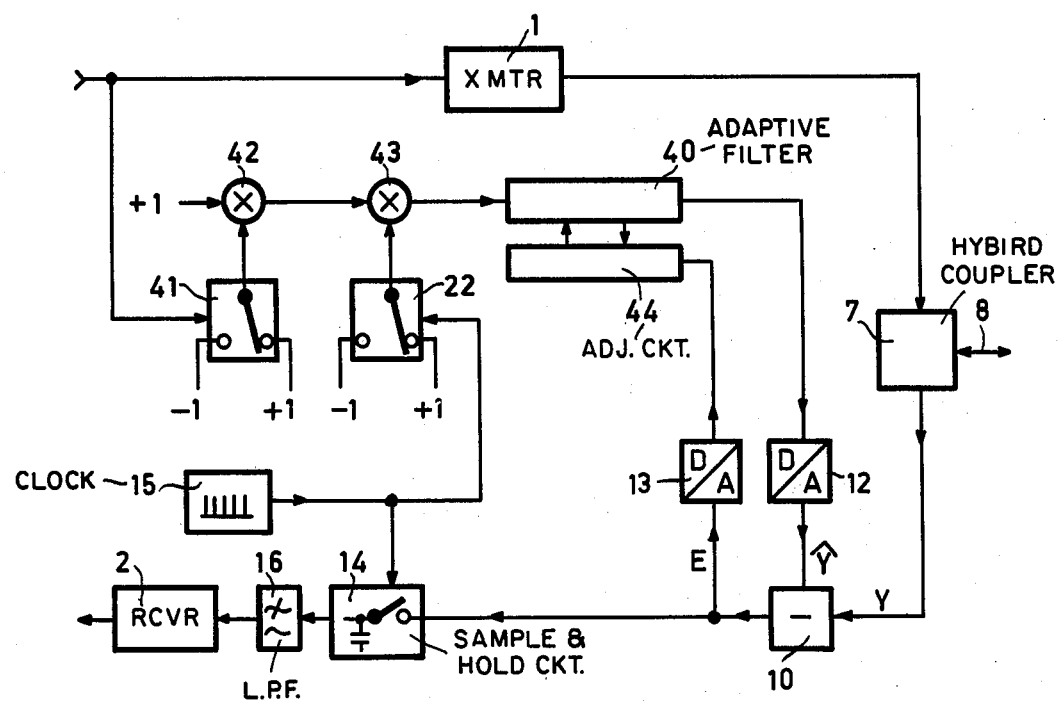
FIG. 5 is a block diagram derived from that of FIG. 1 and used for binary phase modulation of a carrier.

FIG. 5 and FIG. 6 show by way of illustration the block diagram of an echo canceler in two practical cases of phase modulation which enable the reduction of the number of filters $F_j$ to N/2. These FIGS. 5 and 6 comprise a certain number of elements of FIG. 1 which have been given the same reference numerals.

FIG. 5 relates to the very simple case of binary phase modulation in which the carrier can assume the phases $\phi_1=0$ and $\phi_2=\pi$ and one single amplitude level.

In this case where $N=2$, the binary data to be transmitted are used directly in the echo canceler. This echo canceler comprises only one single adaptive filter 40 thanks to a two-position switch 41 which is controlled by the value of the binary data signal so that either the number $+1$ or the number $-1$ is applied to an input of a multiplier 42. The other input of this multiplier 42 is shown for clarity only and receives the number $+1$ which is considered to be the absolute value of the amplitude of the carrier. The output of multiplier 42 is connected to an input of multiplier 43, the other input of which receives the numbers $+1$ or $-1$ originating from a switch 22 which has the same function as in FIG. 1. The output of multiplier 43 is connected to the input of the adaptive digital filter 40 whose output supplies the echo copy signal in digital form. An adjusting circuit 44 adjusts the coefficients of this digital filter 40 by means of the error signal E. This digital filter 40 processes input numbers of one bit only.

Figure 7:
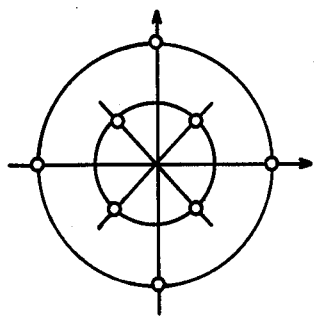
FIG. 7 shows the phase and amplitude characteristics associated with the circuit diagram of FIG. 6.

FIG. 6 relates to the case of octonary phase modulation ($N=8$) with, for example, two amplitude levels 1 and 1/2 which, as shown by the conventional phase diagram of FIG. 7, are distributed as follows: for the phases 0, $\pi/2$, $\pi$, $3\pi/2$ the amplitude of the carrier is 1 whereas this amplitude is 1/2 for the phases $\pi/4$, $3\pi/4$, $5\pi/4$, $7\pi/4$. It is obvious that in this case four phases of the carrier differ an amount of $\pi$ radians from four other phases and that the number of adaptive filters of the echo canceler can be reduced to four. In addition, FIG. 6 shows a possible embodiment of the commutator circuit passing the amplitudes of the carrier to the adaptive filters. Series-to-parallel converter 17 supplies 3-bit symbols ("tribits") at a rate 1/T and at the instants iT. In the example chosen the number (8) of possible phases of the carrier is equal to the number (8) of possible tribit configurations. The tribits are applied to logic device 19 which has, in this case, 8 outputs $u_1$-$u_8$, corresponding each to a given configuration of the tribits. A logic pulse "1" appears at each instant iT at one of the outputs $u_1$-$u_8$. A logic pulse "1" at the output $u_1$-$u_4$ corresponds to the carrier phases 0, $\pi/4$, $\pi/2$, $3\pi/4$. A logic pulse "1" at the outputs $u_5$-$u_8$ corresponds to the carrier phases $\pi$, $5\pi/4$, $3\pi/2$, $7\pi/4$.

In the 4 diagonal positions of a ROM-store 50 shown as a 4th order matrix, the respective numbers 1, 1/2, 1, 1/2, are entered which correspond to the two possible amplitudes of the carrier, whereas the numbers 0 are entered in all further positions. The pairs of outputs $u_1$ and $u_5$, $u_2$ and $u_6$, $u_3$ and $u_7$, $u_4$ and $u_8$ of logic device 19 are connected to the respective inputs of OR-gates 511, 512, 513, 514.

The outputs of these OR-gates 511, 512, 513, 514 all enable reading the numbers entered in the columns 501, 502, 503, 504 of this store 50, the numbers read from a column simultaneously appearing at the outputs $v_1$, $v_2$, $v_3$, $v_4$. The numbers appearing at these outputs $v_1$, $v_2$, $v_3$, $v_4$, are applied to an input of multipliers 521, 522, 523, 524. Depending on whether logic device 19 supplies a logic pulse "1" at the outputs $u_1$-$u_4$ or at the outputs $u_5$-$u_8$ the number $+1$ or the number $-1$ is applied to the other input of these multipliers through a two-position switch 53. So, if a logic pulse "1" appears at the outputs $u_1$, $u_2$, $u_3$, $u_4$ of logic device 19 there appear at the outputs of the respective multipliers 521, 522, 523, 524 the numbers $+1$, $+1/2$, $+1$, $+1/2$. If a logic pulse "1" appears at the outputs $u_5$, $u_6$, $u_7$, $u_8$ of logic device 19, the numbers $-1$ $-1/2$, $-1$, $-1/2$ appear at the outputs of the respective multipliers 521, 522, 523, 524.

The output of multipliers 521-524 is connected to the input of multipliers $P_1$-$P_4$, the other input of which receives the numbers $+1$ or $-1$ originating from the switch 22. The output of multipliers $P_1$-$P_4$ is connected to the input of adaptive digital filters $F_1$-$F_4$. From the preceding it then follows that the filters $F_1$, $F_2$, $F_3$, $F_4$ process numbers whose absolute value is equal to 1, 1/2, 1, 1/2, respectively, and which correspond to the respective carrier phases 0 or $\pi$, $\pi/4$, or $5\pi/5$, $\pi/2$ or $3\pi/2$, $3\pi/4$ or $7\pi/4$. The outputs of these filters $F_1$-$F_4$ are connected to adder 23, the output of which supplies the echo copy signal in digital form. The adjusting circuits $C_1$-$C_4$ adjust the coefficients of filters $F_1$-$F_4$ under the control of the error signal E. The input numbers of these filters can assume five values 0, $+1$, $+1/2$ and can be represented by means of 3 bits.

A second embodiment of the echo canceler according to the invention will now be described, which embodiment uses only two adaptive filters instead of a number of adaptive filters depending on the number N of the phases which can be allotted to the carrier. This second embodiment is shown in the circuit diagram of FIG. 8, which includes a certain number of elements of FIG. 1 having the same reference numerals. For the time being it is still assumed that the ratio $2f_o/(1/T)$ is equal to an integer p.

Figure 8:
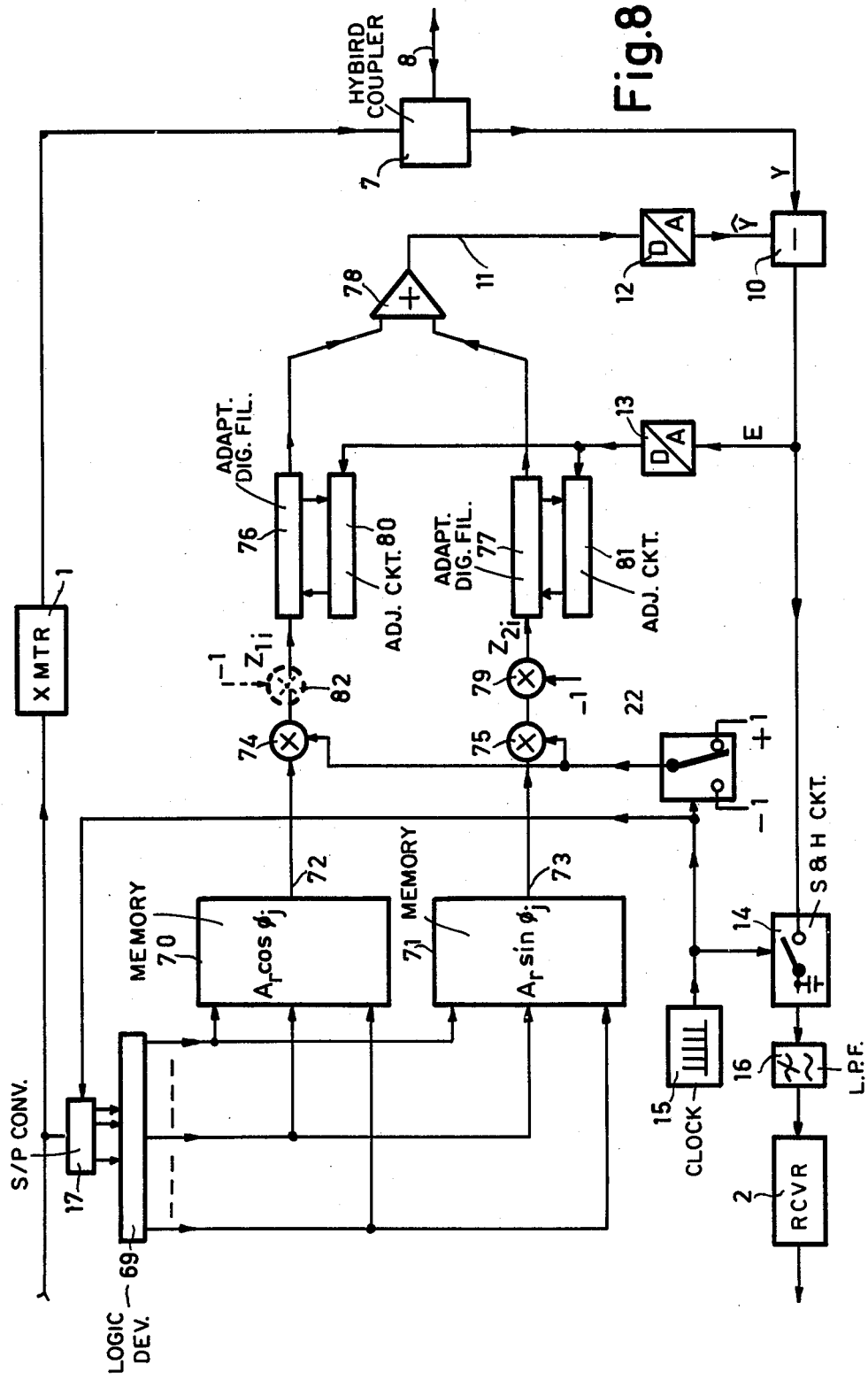
FIG. 8 is a block diagram of a second embodiment of an echo caneler according to the invention used for the phase and amplitude modulation of a carrier in the case in which the ratio $f_o/(1/T)$ is of the form p/2 or (2p+1)/4.

At instants iT the series-to-parallel converter 17 in FIG. 8 supplies m-bit symbols whose number of possible configurations is $Q=2^m$. An amplitude-phase pair ($A_r$, $\phi_j$) of the carrier corresponds to each of these configurations, $A_r$ being one of the M possible amplitudes of the carrier and $\phi_j$ one of the N possible phases of the carriers. The symbols are applied to a logic device 69 having Q outputs, each detecting one of the Q possible symbol configurations and producing a logic "1" at an output corresponding to the detected configuration. These Q outputs of logic device 69 are connected so to two memories 70 and 71 that they control the reading of the numbers stored in these memories. Stored in memories 70 and 71 are Q numbers $A_r \cos \phi_j$ and $A_r \sin \phi_j$, which correspond to Q amplitude-phase pairs of the carrier. At each instant iT at which a logic "1" at an output of logic device 69 the respective numbers $A_{ir} \cos \phi_{ij}$ and $A_{ir} \sin \phi_{ij}$ appear at the outputs 72, 73 of memories 70, 71. These numbers are applied to an input of two multipliers 74 and 75, the other input of which is connected to switch 22 for performing the function $(-1)^{pi}$. The numbers generated by multiplier 74 form the numbers $Z_{1i}$ which are applied to an adaptive digital filter 76. The sign of the numbers generated by multiplier 75 is inverted by means of a multiplier 79 and after this sign inversion the numbers $Z_{2i}$ are obtained which are applied to an adaptive digital filter 77. An adder 78 forms the sum of the output signals of filters 76 and 77 and supplies the echo copy signal in digital form.

The coefficients of filters 76, 77 are adjusted by means of adjusting circuits 80, 81 to which the error signal E is applied in digital form.

The structure and the operation of the echo canceler of FIG. 8 derive from a different interpretation of the above-mentioned formula (2) defining the computations to be performed for obtaining the phase and amplitude modulated carrier signal f(t) by means of fixed impulse responses $e_1(t)$ and $e_2(t)$.

In this formula (2) the summing over j can be omitted if $A_{ir}$ (amplitude of the carrier at the instant iT) is substituted for the term $X_{ij}$, which represents N numbers of which one single number is not equal to zero, but equal to the amplitude $A_{ir}$. If this is taken into account and formula (2) is elaborated, formula (2) can be written into the following form:

$$f(t) = \sum_{i=-\infty}^{+\infty} Z_{1i} \cdot e_1(t - iT) + \sum_{i=-\infty}^{+\infty} Z_{2i} \cdot e_2(t - iT) \quad (15)$$

where
$$Z_{1i} = (-1)^{pi} A_{ir} \cdot \cos \phi_{ij} \quad (16)$$
$$Z_{2i} = -(-1)^{pi} A_{ir} \cdot \sin \phi_{ij} \quad (17)$$

Formula (15) shows that a phase and amplitude-modulated carrier signal can be obtained by forming the sum of the output signals of two digital filters having fixed impulse responses $e_1(t)$ and $e_2(t)$ and receiving at each instant $iT$ the respective numbers $Z_{1i}$ and $Z_{2i}$ which are defined by formulas (16) and (17).

In the case of an echo canceler associated with a modem using phase and amplitude modulation, the echo copy signal $\hat{y}(t)$ can be obtained in accordance with a formula which is analogous to formula (15), but wherein the impulse responses $e_1(t)$ and $e_2(t)$ of the fixed filters have been replaced by variable impulse responses $G_1(t)$ and $G_2(t)$ of adaptive filters controlled by the error signal $E(t)$. So this echo copy signal has the expression:

$$\hat{y}(t) = \sum_{i=-\infty}^{+\infty} Z_{1i} \cdot G_1(t - iT) + \sum_{i=-\infty}^{+\infty} Z_{2i} \cdot G_2(t - iT) \quad (18)$$

After the preceding description it is obvious that the echo canceler of FIG. 8 performs the computations defined in formula (18). The numbers $A_{ir} \cos \phi_{ij}$ and $A_{ir} \sin \phi_{ij}$ are, as explained, derived from the two memories 70 and 71. The sign of these numbers has been changed in accordance with the function $(-1)^{pi}$ by means of the two multipliers 74, 75 which consequently form the numbers $Z_{1i}$ and $-Z_{2i}$. Because the sign of $-Z_{2i}$ is inverted by means of multiplier 79, the required pair of numbers is thus obtained and is applied to the input of adaptive filters 76 and 77. These filters 76 and 77 have variable impulse responses $G_1(t)$ and $G_2(t)$ and compute the respective functions $g_1(t)$ and $g_2(t)$ in accordance with the expressions:

$$g_1(t) = \sum_{i=-\infty}^{+\infty} Z_{1i} \cdot G_1(t - iT) \quad (19)$$
$$g_2(t) = \sum_{i=-\infty}^{+\infty} Z_{2i} \cdot G_2(t - iT)$$

Finally, adder 78 forms the sum $g_1(t) + g_2(t)$, that is to say the desired echo copy signal $\hat{y}(t)$.

Each of the expressions in formula (19) has precisely the same form as above formula (8), which defines the function $g_j(t)$ as it is computed by a filter $F_j$ in the first implementation of the echo canceler according to FIG. 1. All that is explained above for the digital implementation of a filter $F_j$ in FIG. 1 also applies to the digital implementation of a filter 76 or 77 in FIG. 8; particularly, the computations to be performed in these filters are represented by formulas which are analogous to the formulas (13) and the coefficients of these filters are adjusted in an iterative manner in accordance with the formulas which are analogous to the formulas (14). Finally, FIG. 4 shows an embodiment of an adaptive digital filter which embodiment is also suitable for each of the filters 76, 77.

The second implementation of the echo canceler according to the invention shown in FIG. 8, comprises only two auto-adaptive filters but is not necessarily the most advantageous implementation because the multiplications to be performed in these two filters can be more complex than in the first implementation comprising more than two filters. Namely, the numbers $Z_{1i}$ and $Z_{2i}$ at the input of the two filters 76, 77 of FIG. 8 are often complicated because they depend on $\cos \phi_j$ and $\sin \phi_j$. With binary ($N=2$) and quaternary ($N=4$) phase modulation the two implementations are equivalent. With a modulation employing a comparatively large number of phases and amplitude levels, the balance must be drawn up in each special case for choosing the most economic solution. An embodiment of an adaptive filter will now be described which is especially suitable for the second implementation of the echo canceler because the number of complicated multiplications to be performed per unit of time is reduced.

In the above-described embodiments of the echo canceler suitable for phase and amplitude modulation, the usual case is considered in which the ratio $2f_o/(1/T)$ is equal to an integer p, $f_o$ and $1/T$ being respectively the carrier frequency and the symbol rate. Another known case is that in which the ratio $2f_o/(1/T)$ is of the form $(p+\frac{1}{2})$, p again being an integer. In this case it can be proved that the above expression (2) changes into:

$$f(t) = \sum_{j=1}^{N} \sum_{i=-\infty}^{+\infty} (-1)^{pi} \cdot X_{ij} \cdot [-e_1(t - iT)\cos\phi_{ij} - e_2(t - iT)\sin\phi_{ij}] \quad (20)$$

From this it can be derived that an echo copy signal can be obtained in accordance with a formula which is analogous to the above-mentioned formula (6), namely:

$$\hat{y}(t) = \sum_{j=1}^{N} \sum_{i=-\infty}^{+\infty} X_{ij} \cdot G'_{ij}(t - iT) \quad (21)$$

where: $G'_{ij}(t) = M(t) * H'_{ij}(t)$ \quad (22)

and: $H'_{ij}(t) = -e_1(t - iT)\cos\phi_{ij} - e_2(t - iT)\sin\phi_{ij}$ \quad (23)

The formulas (22) and (23) can be compared with the above formulas (6) and (3).

From this it finally follows that the block diagram of the first implementation of the echo canceler according to FIG. 1 is fully applicable to the case in which $2f_o/(1/T) = (p+1/2)$. A block diagram using N/2 adaptive filters instead of N is, of course, also applicable.

It can be likewise derived from formula (20) that an echo copy signal can be obtained in accordance with a formula which is analogous to the above-mentioned formula (18), namely:

$$\hat{y}(t) = \sum_{i=-\infty}^{+\infty} Z'_{1i} \cdot G_1(t - iT) + \qquad (24)$$

$$\sum_{i=-\infty}^{+\infty} Z'_{2i} \cdot G_2(t - iT)$$

where: $\begin{cases} Z'_{1i} = -Z_{1i} \\ Z'_{2i} = Z_{2i} \end{cases}$ (25)

It is then obvious that the block diagram of the echo canceler in FIG. 8 can also be used in the case in which $2f_o/(1/T)=(p+1/2)$ provided the sign of the numbers generated by multiplier 74 is inverted by means of a multiplier 82 shown in FIG. 8 by means of a dotted line.

The invention can also be used in a more general case, which also includes the cases considered so far and covers all practical needs. In this general case the ratio $f_o/(1/T)$ between the carrier frequency $f_o$ and the symbol rate $1/T$ has the form P/Q, P and Q being integers. As will be proved hereinafter the echo canceler can then also be implemented in accordance with the two above-described embodiments.

Figure 9:
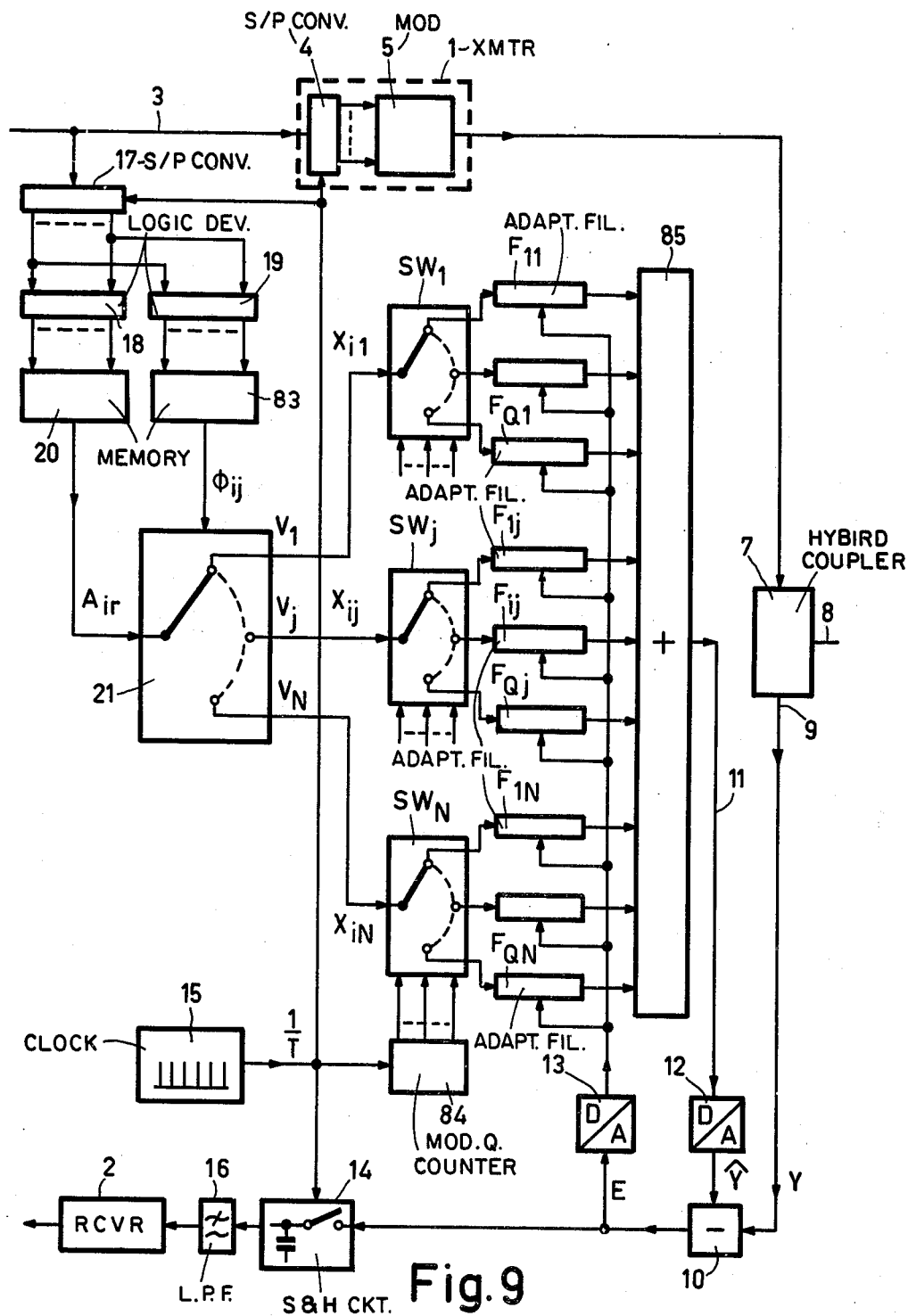
FIG. 9 is a block diagram of a first embodiment of an echo canceler according to the invention used for the phase and amplitude modulation of a carrier when the ratio $f_o/(1/T)$ is of the general form P/Q.

FIG. 9 shows a block diagram of an echo canceler in accordance with the first embodiment, suitable for use in a modem using phase and amplitude modulation and for which the ratio $f_o(1/T)$ is equal to P/Q. The echo canceler of FIG. 9 can be compared to that of FIG. 1 and comprises a given number of identical elements which have all been referenced in the same way. The function and the arrangement of the identical elements will be described first.

The binary data to be transmitted are applied to transmitter 1 of the modem through lead 3. This transmitter 1 modulates a carrier of the frequency $f_o$ in a rhythm $1/T$ determined by clock generator 15. To this end transmitter 1 comprises a series-to-parallel converter 4 for generating m-bit symbols occurring at instants iT and a modulator 5 which allots, in response to the $2^m$ possible symbol configurations, one of the M possible amplitudes $A_{ir}$ to the carrier at each instant iT (r being an integer between 1 and M) and one of the N possible phases $\phi_{ij}$ (j being an integer between 1 and N). The signal supplied by transmitter 1 is applied to transmission line 8 through hybrid coupler 7. The signal originating from transmission line 8 is applied to receiver 2 through hybrid coupler 7. For cancelling the echo signal y appearing at port 9 of hybrid coupler 7 the echo canceler in FIG. 9 comprises difference circuit 10, which receives the echo signal y and an echo copy signal $\hat{y}$ which is generated in digital form in the echo canceler and is converted into the analog form by digital-to-analog converter 12. The error signal $E=y-\hat{y}$ is converted into digital form by analog-to-digital converter 13 for use in the digital echo canceler.

For forming an echo copy signal $\hat{y}$ which reduces the mean square value of the error signal E to a minimum, the unmodulated data signal to be transmitted is applied to the input of the echo canceler. This echo canceler comprises a series-to-parallel converter 17 which supplies at instants iT the same m-bit symbols as those supplied by series-to-parallel converter 4 of transmitter 1. These symbols are applied to a logic circuit 18 by means of which it is possible to read one of the M possible amplitudes allotted to the carrier from memory 20 at each instant iT. The read-out amplitudes $A_{ir}$ are applied to the input of commutator circuit 21, which is shown as a N-position switch. The symbols are also applied to a further logic device 19 by means of which it is possible to read, depending on the symbol at the instant iT, one of the N possible phases $\phi_{ij}$ allotted to the carrier from a memory 83. Each read-out phase $\phi_{ij}$ is used for setting switch 21 to a given position corresponding to this phase. In this manner there appears at each instant iT at the N outputs $v_j$ of switch 21 a set of N numbers $X_{ij}$, one single number of which only is unequal to zero, but equal to the amplitude $A_{ir}$ allotted to the carrier, and appears at an output corresponding to the phase $\phi_{ij}$ allotted to the carrier.

In the case considered in FIG. 9 the ratio $f_o/(1/T)$ has the form P/Q. In the most general case in which the N phases of the carrier have no simple mutual ratios, the N numbers $X_{ij}$ are applied respectively to the common input of N switches $SW_j$, each having Q positions. These N switches $SW_j$ are controlled so that they switch simultaneously from one position to the next position at each instant iT and assume again the same position after Q instants iT. This is realized by means of a modulo-Q counter 84 which counts the pulses having a rare $1/T$ of clock generator 15 and which, on passing through its Q counting positions, successively sets the switches $SW_j$ to their Q positions. Each switch $SW_j$ successively applies its input numbers to the Q adaptive filters $F_{1j}, F_{2j}, \ldots F_{Qj}$ associated with this switch $SW_j$. The output signals of the adaptive filters connected to these N switches $SW_j$ are applied to an adder 85, which supplies the digital version of the echo copy signal at its output. The adaptive filters include the adjusting circuits which adjust the coefficients of the filters under the control of the digital version of the error signal E to minimize a predetermined function of this error signal, for example its mean square value.

The operation of the echo canceler just described will now be explained in a manner which is the same as that used for the explanation of the operation of the echo canceler in FIG. 1.

Starting from the above-mentioned article by Choquet and Nussbaumer it can be proved that a phase and amplitude-modulated carrier signal f(t) can be obtained by performing the following computations:

$$f(t) = \sum_{j=1}^{N} \sum_{i=-\infty}^{+\infty} X_{ij} \cdot H_{ij}(t - iT) \qquad (26)$$

where:

$$H_{ij}(t) = s(t) \cdot \cos(\omega_o t + \phi_{ij} + \omega_o iT) \qquad (27)$$

$X_{ij}$ has the meaning shown in FIG. 9, that is to say $X_{ij}$ is the set of the N numbers at the N outputs $v_j$ of switch 21 at an instant iT.

$H_{ij}(t)$ is an impulse response which, in accordance with formula (27), results from the product of the impulse response s(t) of a fixed filter for limiting the spectrum of the data signals and the modulated carrier signal $\cos(\omega_o t + \phi_{ij} + \omega_o iT)$. This modulated carrier has a frequency $f_o = \omega_o/2\pi$ and a phase $\theta_{ij} = \phi_{ij} + \omega_o iT$ resulting from the sum of the phase $\phi_{ij}$ allotted to the carrier at each instant iT as a function of the data, and of the phase $\omega_o iT$; this latter phase $\omega_o iT$ is the phase of the unmodulated carrier at the instants iT. In the case in which no single relation exists between the carrier frequency $f_o$ and the symbol rate $1/T$ the phase $\omega_o iT$ and, consequently, the impulse response $H_{ij}(t)$, assumes an unlimited number of values. In that case the application of formula (26) for forming a phase and amplitude-modulated carrier results in the use of an unlimited number of filters having impulse response $H_{ij}(t)$ for processing the numbers $X_{ij}$ occurring at each output of switch 21.

If, on the contrary the relation $f_o/(1/T) = P/Q$ exists between carrier frequency $f_o$ and symbol rate 1/T, P and Q being integers, the number of filters to be used is limited. It is then posssible to write formula (27) as:

$$H_{ij}(t) = s(t) \cdot \cos(\omega_o t + \phi_{ij} + 2\pi Pi/Q) \qquad (28)$$

In this formula (28) the phase $2\pi Pi/Q$ of the unmodulated carrier rotates over $2\pi P$ after a sequence of Q values of i, that is to say of Q instants iT. In such sequences the phase assumes only Q different values within an angle of $2\pi$ radians. From this it follows that for each of the possible values of the phase $\phi_{ij}$ the impulse response $H_{ij}(t)$ can assume only a maximum of Q different values which are given by the variation of the phase $2\pi Pi/Q$ as a function of the time. The total number of impulse response values $H_{ij}(t)$ is not more than N·Q.

Therefore, when using the formulas (26) and (28) for forming a phase and amplitude-modulated carrier signal, each number $X_{ij}$ occurring at the instant iT at a given output phase $v_j$ of switch 21 can be applied to one specific filter $F_{ij}$, which is selected from Q filters by means of a switch $SW_j$ which, as described above, is controlled so that the same position is again assumed after Q successive instants iT. If the NQ filters $F_{ij}$ have the fixed impulse responses $H_{ij}(t)$ determined by formula (28), the modulated carrier signal f(t) defined by formula (26) appears at the output of an adder network 85.

By following the basic concept of the invention an echo copy signal is now obtained by using, instead of NQ fixed filters, NQ adaptive filters $F_{ij}$, the coefficients of which are adjusted by means of an error signal E for reducing the mean square value of this error signal to a minimum. If the impulse responses of these NQ adaptive filters are indicated by $G_{ij}(t)$, the echo copy signal $\hat{y}(t)$ is given by an expression analogous to formula (26):

$$\hat{y}(t) = \sum_{j=1}^{N} \sum_{i=-\infty}^{+\infty} X_{ij} \cdot G_{ij}(t - iT) \qquad (29)$$

This echo copy signal $\hat{y}(t)$ is then obtained at the output of adder network 85. If the echo cancelation has been realized the impulse responses $G_{ij}(t)$ satisfy the relation:

$$G_{ij}(t) = M(t) * H_{ij}(t)$$

In this expression M(t) is the impulse response of the echo path and the symbol * indicates the convolution processing.

It is to be noted here that the case now considered in which $f_o/(1/T) = P/Q$ also includes the previously considered cases in which the relation between $f_o$ and 1/T was either $f_o/(1/T) = p/2$ or $f_o/(1/T) = (2p+1)/4$, p being an integer. If the solution used for FIG. 9 is applied to these two last-mentioned cases it appears that the numbers $X_{ij}$ occuring at an output $v_j$ of switch 21 must be applied in one case (Q=2) to two adaptive filters through a two-position switch $SW_j$ and in the other case (Q=4) to four adaptive filters through a four-position switch $SW_j$. But it has already been proved that for these two cases a simpler embodiment can be obtained by using, in accordance with FIG. 1, one adaptive filter only for each output $v_j$, provided the numbers $X'_{ij} = (-1)^{pi} \cdot X_{ij}$ are applied to these filters instead of the numbers $X_{ij}$.

So it appears that in the diagram of FIG. 9 just described, switch 21 and N switches $SW_j$ ultimately serve for applying, at each instant iT, the number having the amplitude value $A_{ir}$ allotted to the carrier to a single adaptive filter $F_{ij}$ which is selected from NQ filters as a function of the phase $\theta_{ij}$ of the carrier at that instant, $\theta_{ij}$ being the sum of one of the N possible phases $\phi_{ij}$ allotted to the carrier as a function of the data, and one of the Q possible phases $2\pi Pi/Q$ of the unmodulated carrier which differ a multiple of $2\pi P$.

Figure 10:
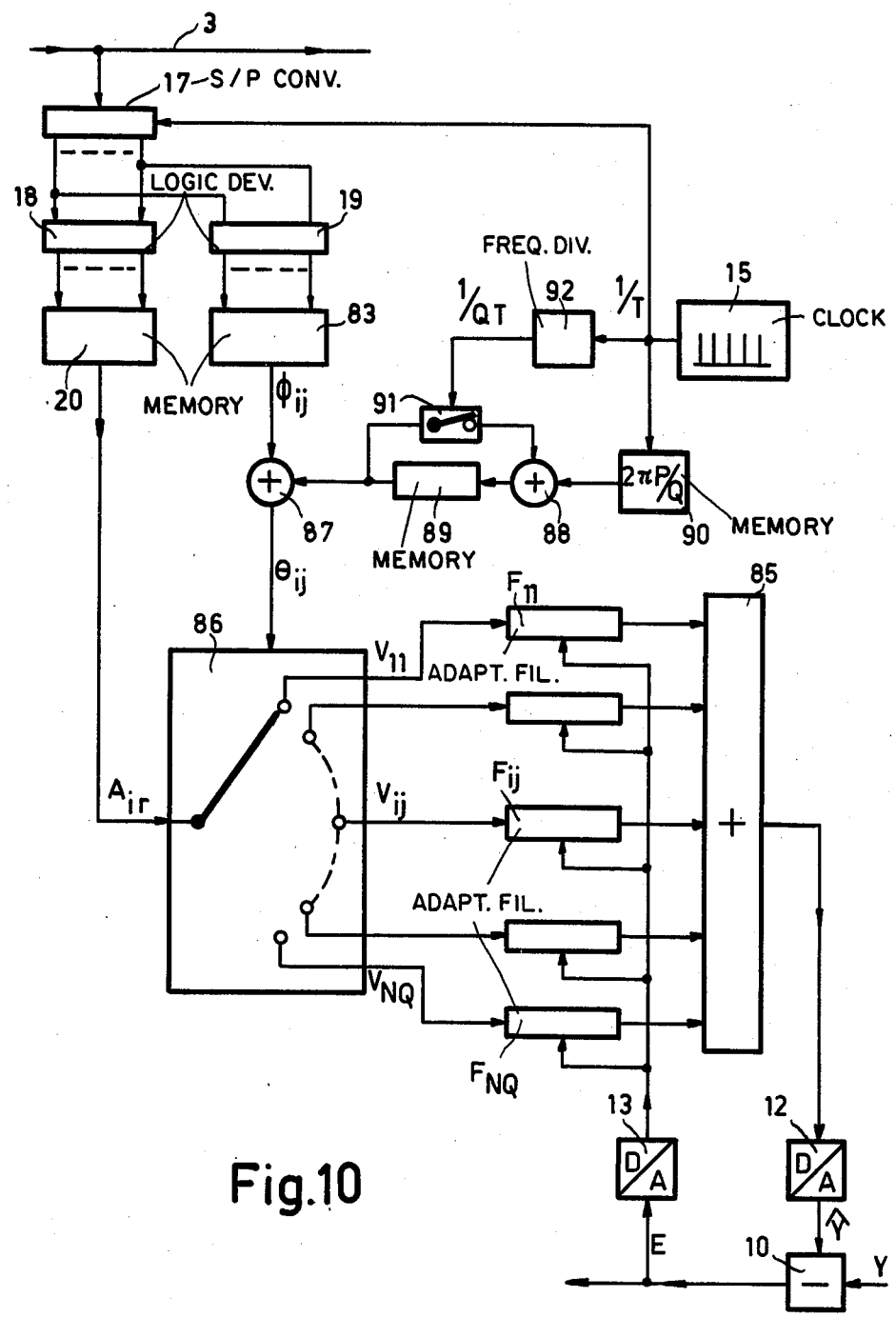
FIG. 10 is a block diagram of a variant of a first embodiment in FIG. 9, which is also used in the case in which the ratio $f_o/(1/T)$ is of the general form P/Q.

The diagram of FIG. 10 shows another embodiment of the echo canceler of FIG. 9 in which the choice of a filter from the set of NQ filters is performed in a different manner. In FIG. 10 the elements which are not part of the actual acho canceler have been omitted, whereas a certain number of elements is identical to that of FIG. 9 and have been given the same reference numerals.

The numbers having the amplitude value $A_{ir}$ of the carrier are obtained in the same manner at the output of memory 20 and applied to the input of a commutator circuit 86 which is shown as a switch having NQ positions corresponding to NQ outputs of the commutator circuit. These NQ outputs $v_j$ (from $v_{11}$ to $v_{NQ}$) are connected directly to NQ adaptive filters $F_{ij}$ (from $F_{11}$ to $F_{NQ}$) which are exactly the same as those of FIG. 9 and whose output signals are added in adder network 85 for forming the echo copy signal.

The selection at each instant iT of the position of switch 86 and, therefore, of the filter $F_{ij}$ to which the number having the amplitude $A_{ir}$ of the carrier must be applied, is performed by controlling switch 86 by means of a number corresponding to the phase $\theta_{ij}$ of the modulated carrier, whereby this switch is set to a position corresponding with this phase. This phase $\theta_{ij}$ is obtained at the output of an adder 87 which receives at one input the phase $\phi_{ij}$ obtained at the output of a memory 83, and at a different input the sequence of the Q phases of the unmodulated carrier which differ a multiple of $2\pi P$ and which can be represented by the expression $2\pi Pi/Q$, i being an integer limited to the values from 0 to (Q−1).

This sequence of Q phases $2\pi Pi/Q$ is generated by means of an accumulator formed by an adder 88, the output of which is connected to a memory register 89, the output of this register 89 being connected to an input of the adder 87 and, furthermore, fed back to an input of adder 88. The other input of adder 88 receives at each instant iT determined by clock generator 15 the phase $2\pi P/Q$ which is available in digital form in a memory 90. The feedback of the output of memory register 89 to an input of adder 88 is interrupted by means of an interrupt switch 91 and instants occurring at a rate 1/QT. This interrupt switch 91 is controlled by a frequency divider 92 dividing the rate 1/T of the pulses of clock generator 15 by Q. It is therefore easy to see that at the output of memory register 89 the sequence of Q desired phases appears which sequence repeats itself with a rate 1/QT.

In practice the number of phases $\theta_{ij}$ of the modulated carrier determining the number of adaptive filters $F_{ij}$ to be used in the echo canceler of FIG. 9 and FIG. 10, is often smaller than NQ. If the N possible phases $\phi_{ij}$ allotted to the carrier as a function of the data are spaced at regular distances (which is usually the case) this can be easily checked by adding each of these N phases $\phi_{ij}$ to each of the Q phases $2\pi Pi/Q$ ($0 \leq i \leq Q-q$), that the number of phases $\theta_{ij}$ of the modulated carrier is equal to the least common multiple of N and Q, this least common multiple usually being smaller than the product NQ. The number of adaptive filters $F_{ij}$ used in FIG. 9 and FIG. 10 will therefore be in general equal to the least common multiple of N and Q and the switching means for selecting at each instant iT one single filter will be accordingly adapted to the number of filters. In the echo canceler of FIG. 10 switch 86 will therefore have a number of positions which is equal to the least common multiple of N and Q. In a special case occurring in practice, in which $N=Q$, the number of different phases $\theta_{ij}$, the number of positions of switch 86 and the number of filters $F_{ij}$ will each be equal to $N=Q$.

The number of adaptive filters can be still further reduced in all the above considered cases if, as customary, half of the phases $\theta_{ij}$ differ an amount of $\pi$ radians from the other half of the phases $\theta_{ij}$. The preceding can therefore also be used in this case, for which it follows that a single adaptive filter can be used for each pair of filters which corresponds to two phases $\theta_{ij}$ differing an amount of $\pi$ radians, the sign of the amplitude $A_{ir}$ applied to this filter being changed or not changed, depending on whether one or the other of these two phases $\phi_{ij}$ is used. So in this case the number of adaptive filters can be reduced by a factor of two.

As regards the practical implementation in digital form of the adaptive filters $F_{ij}$ the block diagram shown in FIG. 4 can be used for each filter. In general these filters can be implemented in a simple manner because they process numbers having the values of the amplitudes $A_{ir}$ allotted to the carrier, these values usually being limited in number and having simple mutual ratios.

FIG. 8 described a second implementation of the echo canceler according to the invention which still comprises only two adaptive filters. The second implementation can also be used in the case now considered in which the ratio $f_0/(1/T)$ has the general form P/Q. Before descriving the circuit diagram of FIG. 11, which corresponds to this second implementation, the basic formulas from which it results will be explained.

As indicated previously, a phase and amplitude-modulated carrier signal f(t) can be obtained by performing the computations defined in formula (26), in which $H_{ij}(t)$ is defined in formula (28) for the case in which $f_0/(1/T)=P/Q$. By developing the cosine term in formula (28) $H_{ij}(t)$ can be written as:

$$H_{ij}(t) = e_1(t) \cos(\phi_{ij} + 2\pi Pi/Q) - e_2(t) \sin(\phi_{ij} + 2\pi Pi/Q) \quad (30)$$

where:

$$\left. \begin{array}{l} e_1(t) = s(t) \cos \omega_0 t \\ e_2(t) = s(t) \sin \omega_0 t \end{array} \right] \quad (31)$$

By introducing in formula (26) the expression (30) for $H_{ij}(t)$ and, furthermore, replacing the term $X_{ij}$ representing N numbers of which only one is not equal to zero but equal to $A_{ir}$, by $A_{ir}$ (the amplitude of the carrier at the instant iT) the summing over j can be omitted and formula (26) can be written as:

$$f(t) = \sum_{i=-\infty}^{+\infty} Z_{1i} \cdot e_1(t-iT) + \sum_{i=-\infty}^{+\infty} Z_{2i} \cdot e_2(t-iT) \quad (32)$$

where:

$$\left. \begin{array}{l} Z_{1i} = A_{ir} \cdot \cos(\phi_{ij} + 2\pi Pi/Q) = A_{ir} \cos \theta_{ij} \\ Z_{2i} = A_{ir} \cdot \sin(\phi_{ij} + 2\pi Pi/Q) = A_{ir} \sin \theta_{ij} \end{array} \right] \quad (33)$$

Formula (32) proves that the signal f(t) can be obtained by forming the sum of the output signals of the two digital filters having the fixed impulse responses $e_1(t)$ and $e_2(t)$ receiving at each instant iT the respective numbers $Z_{1i}$ and $Z_{2i}$. These numbers $Z_{1i}$ and $Z_{2i}$ are defined in formula (33) and can generally assume a number of values equal to the product M.R. of the number of M of the carrier amplitudes $A_{ir}$ and of the number R of the carrier phases $\theta_{ij}$, R being in practice, as was already proved, equal to the least common multiple of N and Q.

From the basic concept of the invention it follows that the echo copy signal $\hat{y}(t)$ can be supplied by an expression which is analogous to formula (32), but in which the impulse responses $e_1(t)$ and $e_2(t)$ of two fixed filters are replaced by various impulse responses $G_1(t)$ and $G_2(t)$ of two adaptive filters which are controlled by an error signal E. So this echo copy signal must be expressed as:

$$\hat{y}(t) = \sum_{i=-\infty}^{+\infty} Z_{1i} G_1(t-iT) + \sum_{i=-\infty}^{+\infty} Z_{2i} G_2(t-iT) \quad (34)$$

Figure 11:
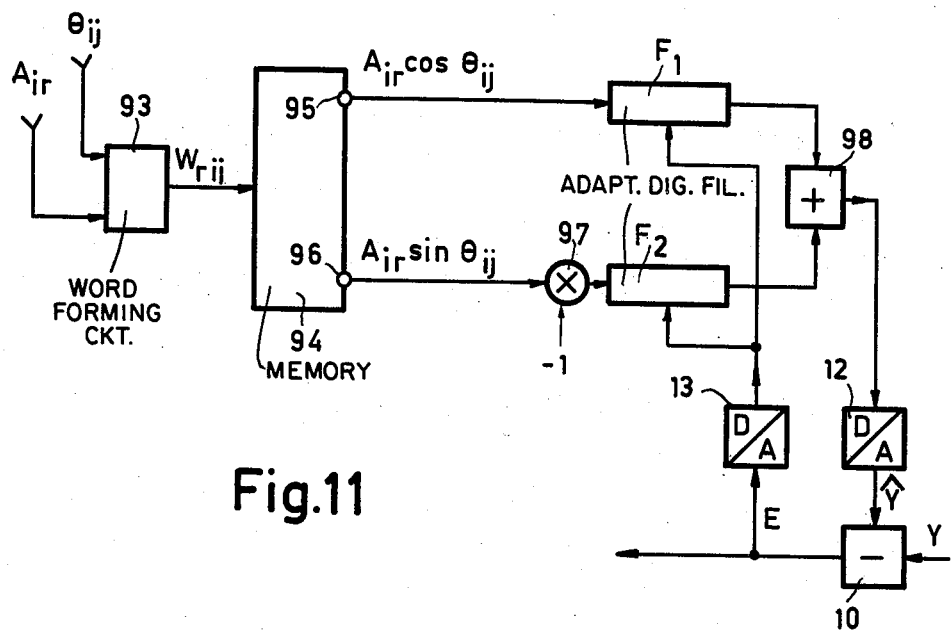
FIG. 11 is a block diagram of a second embodiment of an echo canceler according to the invention used in the case in which the ratio $f_o/(1/T)$ is of the general form P/Q.

In the second implementation of the echo canceler according to the invention, as shown in FIG. 11, formula (34) is completed by the formulas (33) used for obtaining the echo copy signal.

Firstly, in exactly the same manner as in FIG. 10 and by means of the same circuits, the numbers are formed which represent at the instants iT the amplitude values $A_{ir}$ of the carrier as well as the numbers which represent at the instants iT the phase value $\theta_{ij}=\phi_{ij}+2\pi Pi/Q$ of the modulated carrier. The numbers representing the amplitudes $A_{ir}$ and the phases $\theta_{ij}$ are associated in a circuit 93 for forming words $W_{rij}$ which can generally assume a number of configurations equal to the product of M and the least common multiple of N and Q. All possible values of the pairs of numbers $A_{ir} \cos \theta_{ij}$ and $A_{ir} \sin \theta_{ij}$ have been written into a memory 94. The words $W_{rij}$ are used for reading a given a pair of numbers from memory 94 at each instant iT. The numbers $A_{ir} \cos \theta_{ij}$ appear at an output 95 of this memory 94 and form the numbers $Z_{1i}$ of formulas (33). The numbers $A_{ir} \sin \theta_{ij}$ appear at an output 96 of this memory 94 and after their sign has been changed by means of a multiplier 97 they form the numbers $Z_{2i}$ of formulas (33). The computations defined in formula (34) are performed into adaptive filters $F_1$ and $F_2$ which process the numbers $Z_{1i}$ and $Z_{2i}$ and whose output signals are added in an adder 98, whereas the coefficients of these filters $F_1$ and $F_2$ are adjusted by means of the error signal E. The echo copy signal $\hat{y}(t)$ is obtained at the output of adder 98.

The number of values of $A_{ir} \cos \theta_{ij}$ and $A_{ir} \sin \theta_{ij}$, stored in memory 94, can usually be markedly reduced if the fact is taken into account that in the practical modulation cases a given number of all possible values of the phase $\theta_{ij}$ differs by exactly an amount of $\pi$ or $\pi/2$ from other phase values.

As regards the adaptive filters $F_1$ and $F_2$, they can be implemented in digital form in accordance with the embodiment shown in FIG. 4. If applied directly to the implementation of the two filters $F_1$ and $F_2$ this embodiment may, however, often result in a large number of complicated multiplications. Before describing a different, practical and particularly simple embodiment of an assembly of both filters $F_1$ and $F_2$, it is first of all necessary to bring the detailed computations to be performed in these filters to mind, using the notations given above.

For the sampling instants $t_{nk}$ it holds that $t_{nk} = nT + kT/q$, n being an integer varying between $-\infty$ and $+\infty$, q being a fixed integer, for example 6, and k being a variable integer between 0 and $(q-1)$. If $Z_{1i}(n)$ and $Z_{2i}(n)$ are the numbers entering these filters $F_1$ and $F_2$ at a given instant nT these filters compute respectively at q instants $nT + kT/q$ ($0 \leq k \leq q-1$) the functions:

$$g_1(nT + kT/q) = \sum_{i=1}^{L} Z_{1i}(n) \cdot G_1(nT - iT + kT/g) \quad (35)$$

$$g_2(nT + kT/q) = \sum_{i=1}^{L} Z_{2i}(n) \cdot G_2(nT - iT + kT/q)$$

At these instants $nT + kT/q$ the echo copy signal is:

$$\hat{y}(nT + kT/q) = g_1(nT + kT/q) + g_2(nT + kT/q) \quad (36)$$

To simplify this notation it is assumed that:

$$\left. \begin{array}{l} g_1(nT + kT/q) = g_{1k}(n) \\ g_2(nT + kT/q) = g_{2k}(n) \\ G_1(nT - iT + kT/q) = G_{1ik}(n) \\ G_2(nT - iT + kT/q) = G_{2ik}(n) \\ \hat{y}(nT + kT/q) = \hat{y}_k(n) \end{array} \right\} \quad (37)$$

The formulas (35) and (36) are then written as:

$$\left. \begin{array}{l} g_{1k}(n) = \sum_{i=1}^{L} Z_{1i}(n) \cdot G_{1ik}(n) \\ g_{2k}(n) = \sum_{i=1}^{L} Z_{2i}(n) \cdot G_{2ik}(n) \end{array} \right\} \quad (38)$$

and $$\hat{y}_k(n) = g_{1k}(n) + g_{2k}(n) \quad (39)$$

In formulas (38) the terms $G_{1ik}(n)$ and $G_{2ik}(n)$ represent the L filter coefficients ($1 \leq i \leq L$) at a given instant $t_{nk}$, which must each be multiplied by one of the L numbers $Z_{1i}(n)$ or one of the L numbers $Z_{2i}(n)$.

If the filter coefficients are adjusted to minimize the mean square value of the error signal, using the algorithm of the gradient, this adjustment is performed in successive iteration steps in accordance with the relations:

$$\left. \begin{array}{l} G_{1ik}(n+1) = G_{1ik}(n) + \mu E_k(n) \cdot Z_{1i}(n) \\ G_{2ik}(n+1) = G_{2ik}(n) + \mu E_k(n) \cdot Z_{2i}(n) \end{array} \right\} \quad (40)$$

FIG. 4 shows a digital filter structure in which the computations as indicated in each of the formula (38) are performed at each sampling instant $t_{nk}$. If these formulas are used directly for computing at each instant $t_{nk}$ the output number $G_{1k}(n)$ of filter $F_1$, L multiplications of the L numbers $Z_{1i}(n)$ by the L filter coefficients $G_{1ik}(n)$ must be performed and likewise, for computing the output number $G_{2ik}(n)$ of filter $F_2$, L multiplications of the L numbers $Z_{2i}(n)$ by the L filter coefficients $G_{2ik}(n)$ must be performed. Each multiplication may require an expensive realization because on the one hand the filter coefficients must be defined with a high accuracy (18 bits for example) and on the other hand the numbers $Z_{1i}(n)$ and $Z_{2i}(n)$ may be complicated numbers which must also be represented by many bits, especially because these numbers are proportional to $\cos\theta_{ij}$ and $\sin\theta_{ij}$ (see formula 33). In other words, in accordance with this concept each filter $F_1$ and $F_2$ must be arranged for performing L "complicated" multiplications during an interval T/q subsequent to each sampling instant $t_{nk}$.

In practice this number of "complicated" multiplications can be reduced drastically by performing the required computations in a different manner in the filters $F_1$ and $F_2$. This new method will firstly be described in a general manner. It is based on the fact that, in the practical modulation cases, of the M.R possible values of the numbers $Z_{1i}(n)$ and the M.R. possible values of the numbers $Z_{2i}(n)$ a given number of these values are equal, whereas other differ only as regards their sign.

The number entering the two filters $F_1$ and $F_2$ can be written as:

$$\left. \begin{array}{l} Z_{1i}(n) = \epsilon_{1i} \cdot |Z_{1i}(n)| \\ Z_{2i}(n) = \epsilon_{2i} \cdot |Z_{2i}(n)| \end{array} \right\} \quad (41)$$

where:

$$\epsilon_{1i} = \pm 1 \quad \epsilon_{2i} = \pm 1$$

The absolute values $Z_{1i}(n)$ and $Z_{2i}(n)$ can assume only a limited number of values which will be indicated by $a_1, a_2, \ldots a_p$ hereinafter.

In this manner the L numbers $Z_{1i}(n)$ occurring in the first formula (38) can be split into:

$\alpha_1$ numbers $Z_{1\alpha}(n)$ having the absolute value $a_1$ and sign $\epsilon_{1\alpha}$
$(1 \leq \alpha \leq \alpha_1)$
$\beta_1$ numbers $Z_{1\beta}(n)$ having the absolute value $a_1$ and sign $\epsilon_{1\beta}$
$(1 \leq \beta \leq \beta_1)$

.
.
.

$\gamma_1$ numbers $Z_{1\gamma}(n)$ having the absolute value $a_p$ and sign $\epsilon_{1\gamma}$
$(1 \leq \gamma \leq \gamma_1)$ Likewise the L numbers $Z_{2i}(n)$ occurring in the second formula (38) can be split into:

$\alpha_2$ numbers $Z_{2\alpha}(n)$ with the absolute value $a_1$ and sign $\epsilon_{2\alpha}$
$(1 \leq \alpha \leq \alpha_2)$
$\beta_2$ numbers $Z_{2\beta}(n)$ with the absolute value $a_2$ and sign $\epsilon_{2\beta}$
$(\leq \beta \leq \beta_2)$

.
.
.

$\gamma_2$ numbers $Z_{2\gamma}(n)$ with the absolute value $a_2$ and sign $\epsilon_{2\gamma}$
$(1 \leq \gamma \leq \gamma_2)$ Apparently it therefore applies that:

$$\alpha_1 + \beta_1 + \ldots + \gamma_1 = L$$

$$\alpha_2 + \beta_2 + \ldots + \gamma_2 = L$$

It is therefore easy to see that the expressions for $g_{1k}(n)$ and $g_{2k}(n)$ as given by the formulas (38) can then be rewritten with the absolute values $a_1, a_2, \ldots a_p$ as a factor and with the variables $\alpha, \beta, \gamma$ going respectively from 1 to $\alpha_1$ (or $\gamma_2$) from 1 to $\beta_1$ (or $\beta_2$) and from 1 to $\gamma_1$ (or $\gamma_2$) instead of the variable i going from 1 to L. If these computations have been performed it is easy to derive that the echo copy samples $\hat{y}_k(n)$ given by formula (3) can be rewritten in the form:

$$\hat{y}_k(n) = a_1 \left[ \sum_{\alpha=1}^{\alpha_1} \epsilon_{1\alpha} \cdot G_{1\alpha k}(n) + \sum_{\alpha=1}^{\alpha_2} \epsilon_{2\alpha} \cdot G_{2\alpha k}(n) \right]$$

$$+ a_2 \left[ \sum_{\beta=1}^{\beta_1} \epsilon_{1\beta} \cdot G_{1\beta k}(n) + \sum_{\beta=1}^{\beta_2} \epsilon_{2\beta} \cdot G_{2\beta k}(n) \right] + ...$$

$$+ a_p \left[ \sum_{\gamma=1}^{\gamma_1} \epsilon_{1\gamma} \cdot G_{1\gamma k}(n) + \sum_{\gamma=1}^{\gamma_2} \epsilon_{2\gamma} \cdot G_{2\gamma k}(n) \right]$$

(42)

This formula (42) shows how each sample of the echo copy signal can be computed in digital arrangement which acts the part allotted in FIG. 11 to the assembly of memory 94, multiplier 97, filters $F_1$, $F_2$ and adder 98. In this digital arrangement each number $W_{irj}$ which characterizes the amplitude phase pair ($A_{ir}$, $\theta_{ij}$) of the carrier is coded so that the sign and the absolute value $a_1, a_2, \ldots$ or $a_p$ of the numbers $Z_{1i}(n)$ and $Z_{2i}(n)$ are obtained. In this manner it can be determined whether each number $Z_{1i}(n)$ belongs to the numbers $Z_{1\alpha}(n)$, $Z_{1\beta}(n), \ldots$ or $Z_{1\gamma}(n)$ and whether each number $Z_{2i}(n)$ belongs to the numbers $Z_{2\alpha}(n)$, $Z_{2\beta}(n), \ldots$ or $Z_{2\gamma}(n)$.

The digital arrangement comprises a memory for storing at each instant $t_{nk}$ the L numbers $W_{irj}$ to be processed. At each instant $t_{nk}$ and depending on the code the 2L products are formed which occur in the sums between large brackets in formula (42). These products can of course be realized in a very simple manner because they simply consist in changing or not changing the sign of the L coefficients $G_{1\alpha k}(n)$, $G_{1\beta k}(n), \ldots G_{1\gamma k}(n)$ of filter $F_1$ and of the L coefficients $G_{2\alpha k}(n)$, $G_{2\beta k}(n), \ldots G_{2\gamma k}(n)$ of filter $F_2$. Depending on the code of the products of the term which are characterized by the denominations $\alpha, \beta, \ldots$ or $\gamma$ are applied to either an accumulator forming the sum to be multiplied by $a_1$ or an accumulator forming the sum to be multiplied by $a_2$, or an accumulator forming the sum to be multiplied by $a_p$.

Said sums, formed in the p accumulators are then multiplied once every instant $t_{nk}$ by the respective numbers $a_1, a_2, \ldots a_p$. The products thus obtained are then added for forming in accordance with formula (42) the digital sample of the echo copy signal $\hat{y}_k(n)$. Instead of the 2L "complicated" multiplications which can be expected in the two filters $F_1$, $F_2$ for each instant $t_{nk}$, they appear to have been reduced to a maximum of p "complicated" multiplications. The number of "complicated" multiplications is actually still further reduced if the fact is taken into account that also the values 0 and 1 are generally found among the absolute values $a_1, a_2, \ldots a_p$.

Now it will be proved in a practical modulation case how the computing arrangement just described can in general be realized. This practical case, given by way of example, relates to the data transmission with 4800 bit/s by means of octonary phase modulation without amplitude modulation. The carrier frequency $f_o$ is 1800 Hz. The 8 phases $\phi_j$ allotted in to the carrier as a function of the data are multiples of $\pi/4$ including the value 0. These phases are allotted in dependency of the 8 possible configurations of data grouped in tribits. The symbol rate amounts to 1600 Hz. So the ratio $f_o/(1/T)$ amounts to $f_o/(1/T)=P/Q=9/8$ from which it is easy to derive that the phases $\theta_{ij}$ of the modulated carrier between 0 and $2\pi$ ($2\pi$ being excluded) can only assume 8 values equal to multiples of $\pi/4$, the value 0 included. Because the amplitude $A_{ir}$ of the carrier is constant this amplitude may be assumed to be equal to 1, so that hereafter the term $A_{ir}$ and the index r in the various formulas used will not be taken into account. In the following table I the first column shows the 8 phases $\theta_{ij}$ of the carrier which phases may be considered to be equal to the numbers $W_{ij}$. The second and third column show the values $\cos \theta_{ij}$ and $-\sin \theta_{ij}$ which may be considered to be equal to the numbers $Z_{1i}$ and $Z_{2i}$ (see formulas 33). These numbers can only assume 5 values 0, $\pm 1$, $\pm\sqrt{2}/2$ and a number pair $Z_{1i}$ and $Z_{2i}$ can be fully defined by a 5-bit number $b_1, b_2, b_3, b_4, b_5$ as shown in the five last columns of table I. The bits $b_1$ and $b_2$ indicate the sign of $Z_{1i}$ and $Z_{2i}$ respectively (these bits are equal to "0" in the case of a + sign). The respective bits $b_3$ and $b_4$ indicate whether the amplitude of $Z_{1i}$ and $Z_{2i}$ is zero or not, (these bits are equal to "0" at an amplitude zero). Bit $b_5$ indicates whether the absolute value of the amplitude of $Z_{1i}$ and $Z_{2i}$ is equal to $\sqrt{2}/2$ or not (this bit is equal to "1" at an amplitude $\sqrt{2}/2$).

TABLE I

| $\theta_{ij}$ ($=W_{ij}$) | $Z_{1i}$ ($=\cos \theta_{ij}$) | $Z_{2i}$ ($=-\sin \theta_{ij}$) | $b_1$ | $b_2$ | $b_3$ | $b_4$ | $b_5$ |
|---|---|---|---|---|---|---|---|
| 0 | 1 | 0 | 0 | 0 | 1 | 0 | 0 |
| $\pi/4$ | $+\sqrt{2}/2$ | $-\sqrt{2}/2$ | 0 | 1 | 1 | 1 | 1 |
| $\pi/2$ | 0 | $-1$ | 0 | 1 | 0 | 1 | 0 |
| $3\pi/4$ | $-\sqrt{2}/2$ | $-\sqrt{2}/2$ | 1 | 1 | 1 | 1 | 1 |
| $\pi$ | $-1$ | 0 | 1 | 0 | 1 | 0 | 0 |
| $5\pi/4$ | $-\sqrt{2}/2$ | $+\sqrt{2}/2$ | 1 | 0 | 1 | 1 | 1 |
| $3\pi/2$ | 0 | $+1$ | 0 | 0 | 0 | 1 | 0 |
| $7\pi/4$ | $+\sqrt{2}/2$ | $+\sqrt{2}/2$ | 0 | 0 | 1 | 1 | 1 |

Figure 12:
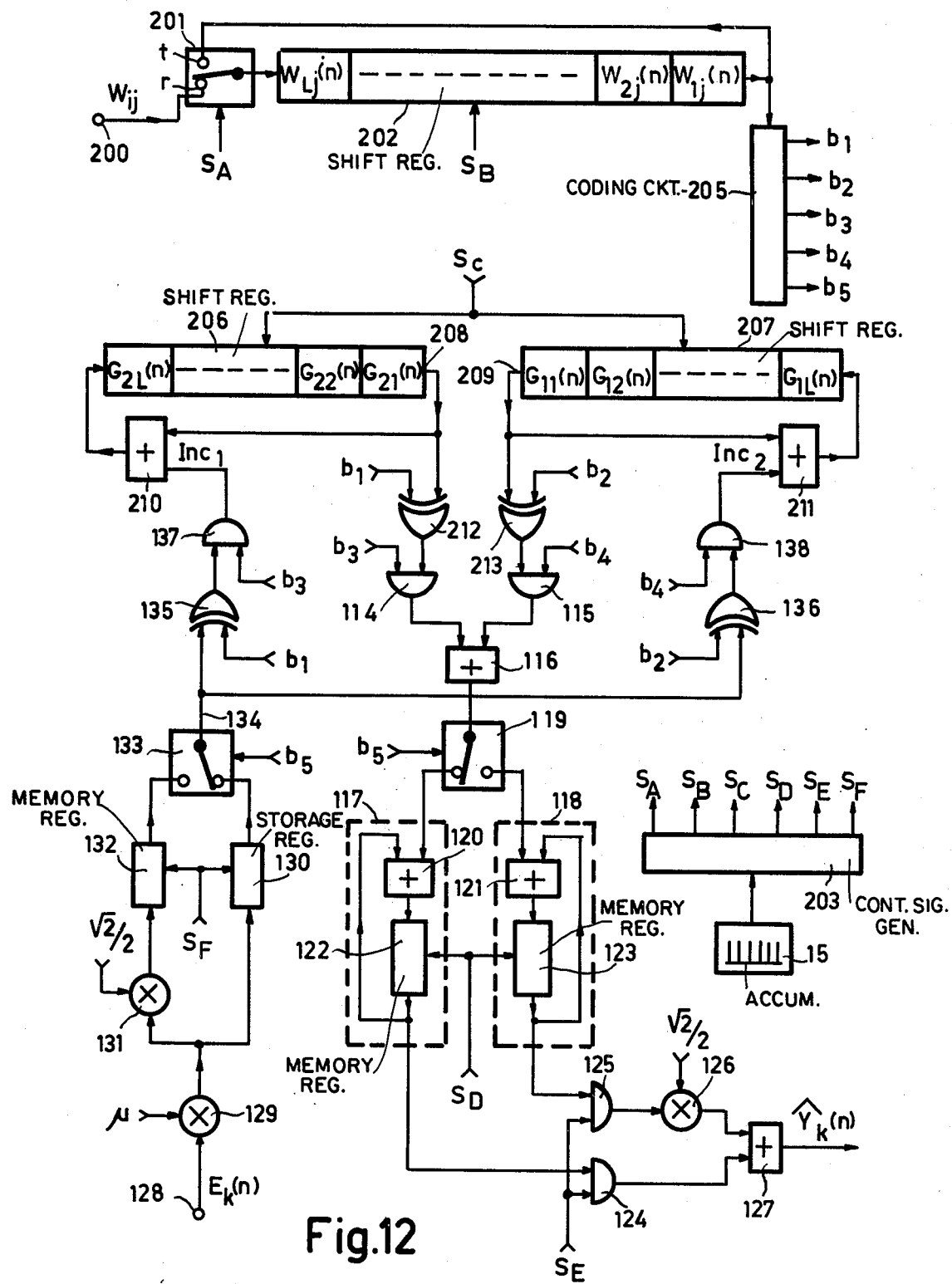
FIG. 12 is a block diagram of an advantageous embodiment of the two adaptive digital filters for the second embodiment of the echo canceler.

In this practical modulation case a digital arrangement can be implemented as shown in FIG. 12, which arrangement performs the function performed in FIG. 11 by memory 94, multiplier 97, filters $F_1$, $F_2$ and adder 98.

The numbers $W_{ij}$ which represent the phases $\theta_{ij}$ and which are formed in exactly the same manner as in FIG. 11 are applied to an input 200 of this digital arrangement. These numbers $W_{ij}$ are applied through a two-position switch 201 in the position r to a shift register 202. This switch 201 is controlled by a control signal $S_A$ supplied by a control signal generator 203 connected to the clock generator 15. The switch 201 is briefly in the position r at the sampling instants nT and in accordance with the notation explained above the numbers applied to shift register 202 are denominated $W_{ij}(n)$. Outside these sampling instants nT switch 201 is in the position t so that the output of register 202 is connected to its input.

Shift register 202 comprises L elements for storing L numbers $W_{ij}(n)$, i being between 1 and L. If switch 201 is in the position t the L numbers $W_{ij}(n)$ are shifted by means of shift pulses which together form a control signal $S_B$ and occur at a rate $Lq/T$. In this manner there occur during a period T between the successive instants nT, q identical sequences of L numbers $W_{ij}(n)$ in series at the output of register 202, each sequence having a duration T/q.

Connected to the output of register 202 is a coding circuit 205 which codes each number $W_{ij}(n)$ into a 5-bit number $b_1$–$b_5$, each having the meaning and the value as indicated in table I. These bits appear in parallel form at the various outputs of coding circuit 205. It should be noted that it is also possible, to perform the same coding on the numbers $W_{ij}(n)$ at the input 200 of register 202. The version, coded into 5 bits, of the numbers $W_{ij}(n)$ is then directly obtained at the output of register 202.

In addition the arrangement of FIG. 12 comprises two shift registers 206 and 207 containing respectively the coefficients $G_{1ik}(n)$ of filter $F_1$ and $G_{2ik}(n)$ of filter $F_2$. For simplicity it is assumed that these registers 206, 207 contain only the coefficients which correspond to a given instant $t_{nk}$. They are then formed each at a given value of k by L elements containing the L coefficients $G_{1ik}(n)$ and $G_{2ik}(n)$, i being situated between 1 and L. The respective L coefficients in register 206, 207 must be multiplied by the L numbers of a sequence of numbers $W_{ij}(n)$ which appear in coded form at the output of coding circuit 205 during a time interval T/q. The outputs 208 and 209 of registers 206 and 207 are fed back to the inputs through adders 210 and 211 respectively. These adders 210 and 211 are used, as will appear below, for modifying the coefficients in registers 206 and 207 by respective increments Inc1 and Inc2. The coefficients in registers 206, 207 are shifted by means of shift pulses having a frequency Lq/T and together forming a control signal $S_C$, so that during a time interval T/q the L coefficients $G_{1ik}(n)$ and $G_{2ik}(n)$ appearing at their outputs 208, 209 correspond to the L numbers $W_{ij}(n)$ appearing in coded form at the outputs of coding circuit 205.

When applying what has been explained above with respect to the computation of $\hat{y}_k(n)$ in accordance with formula (42), each time a 5-bit($b_1$–$b_5$) coded number $W_{ij}(n)$ and two coefficients $G_{1ik}(n)$ and $G_{2ik}(n)$ appear, the coefficient $G_{1ik}(n)$ is multiplied by $+1$ or $-1$, depending on whether the bit $b_1$ of $W_{ij}(n)$ for $Z_{1i}(n)=\cos\theta_{ij}$ indicates a positive or a negative sign, and the coefficient $G_{2ik}(n)$ is multiplied by $+1$ or $-1$, depending on whether the bit $b_2$ of $W_{ij}(n)$ for $Z_{2i}(n)=-\sin\theta_{ij}$ indicates a positive or a negative sign. These very simple multiplications are performed in the customary manner by means of exclusive OR-gates 212, 213. The respective output number of exclusive OR-gates 212 and 213 are applied to AND gates 114 and 115, which furthermore receive the bits $b_3$,$b_4$ of each number $W_{ij}(n)$. As shown in table I it is clear that AND gates 114, 115 have the function of multiplying the numbers, generated by exclusive OR-gates 212, 213 by 0 or 1, depending on whether $\cos\theta_{ij}$ and $\sin\theta_{ij}$ are equal to zero or not.

The pairs of output numbers of AND-gates 114, 115 are combined in an adder 116. Depending on the position of a two-position switch 119 the output of adder 116 is connected to an accumulator 117 (or 118) formed by an adder 120 (or 121) in series with a memory register 122 (or 123), the output of which is fed back to an input of adder 120 (or 121). Switch 119 is controlled by bit $b_5$ of each number $W_{ij}(n)$ so that the output of adder 116 is connected to accumulator 118 if bit $b_5$ indicates that $Z_{1i}(n)$ and $Z_{2i}(n)$ have the same absolute value $\sqrt{2}/2$, and to accumulator 117 if bit $b_5$ indicates that $Z_{1i}(n)$ and $Z_{2i}(n)$ have the same absolute values 0 or 1. If the contents of shift registers 122, 123 is set to the value 0 by a pulse of a control signal $S_D$ occurring precisely at the beginning of each time interval T/q in which the L numbers $W_{ij}(n)$ and the L coefficients $G_{1ik}(n)$ and $G_{2ik}(n)$ are processed, then it is obvious that at the end of this time interval sums are obtained at the output of accumulators 117 and 118 of the type indicated between large brackets in formula (42). Accumulator 118 forms at the end of each time interval T/q an algebraic sum of the terms to be multiplied by $\sqrt{2}/2$. Accumulator 117 forms at the end of each time interval T/q an algebraic sum of terms to be multiplied by 1, it consequently being possible to use this sum as such.

So at the end of each time interval T/q a pulse of a control signal $S_E$ opens two AND-gates 124, 125 which are connected to the output of accumulators 117, 118 for reading the contents of these accumulators. The number read from accumulator 18 is multiplied by $\sqrt{2}/2$ in a multiplier 127 and this multiplied number is added, by means of an adder 127, to the number read from accumulator 117. The number $\hat{y}_k(n)$ representing at the considered instant $t_{nk}$ a sample of the echo copy signal, is then obtained at the output of adder 127.

The increments Inc1 and Inc2 of the coefficients have in accordance with the above formulas (40) at each instant $t_{nk}$ the following values:

$$\begin{bmatrix} \text{Inc1} = \mu \cdot E_k(n) \cdot Z_{1i}(n) \\ \text{Inc2} = \mu \cdot E_k(n) \cdot Z_{2i}(n) \end{bmatrix} \quad (43)$$

The increments are computed in accordance with these formulas (43), taking into account that the values of $Z_{1i}(n)$ and $Z_{2i}(n)$ are included in the 5-bits ($b_1$–$b_5$) coded numbers $W_{ij}(n)$. For performing this computation the digital sample $E_k(n)$ of the error signal appearing at the instants $t_{nk}$ at input 128 is multiplied by the constant coefficient $\mu$ in a multiplier 129. This multiplier 129 is very simple if $\mu$ is chosen equal to a power of two. The term $\mu \cdot E_k(n)$ thus formed is applied to a storage register 130 and to a multiplier 131 which forms once in each instant $t_{nk}$ the product $\mu \cdot E_k(n) \cdot \sqrt{2}/2$, this product being applied to a memory register 132. The contents of both registers 130, 132 is reset to the value 0 by a pulse of a control signal S occurring just prior to the beginning of each time interval T/q which corresponds to an instant $t_{nk}$, and the products formed in these registers remain stored therein during the entire time interval T/q. The products stored in register 130, 132, are read by means of a two-position switch 133 which is controlled by bit $b_5$ of each of the L coded numbers $W_{ij}(n)$ occurring during the time interval T/q. If this bit $b_5$ indicates that $|Z_{1i}(n)|$ and $|Z_{2i}(n)|$ are equal to $\sqrt{2}/2$, register 132 is read and the product $\mu \cdot E_k(n) \cdot \sqrt{2}/2$ appears at the common output 134 of switch 133. If this bit $b_5$ indicates that $|Z_{1i}(n)|$ and $|Z_{2i}(n)|$ are not equal to $\sqrt{2}/2$, register 130 is read and the product $\mu \cdot E_k(n)$ appears at output 134.

The quantity obtained at output 134 is applied to an input of two exclusive OR-gates 135,136 in order to be multiplied by $+1$ or $-1$, depending on whether the bits $b_1$ and $b_2$ applied to the other input indicate a $+$ sign or a $-$ sign for $Z_{1i}(n)$ and $Z_{2i}(n)$.

The quantity obtained at the output of exclusive OR-gates 135,136 is applied to an input of AND-gates 137,138 in order to be multiplied by 0 or 1, depending on whether the bits $b_3$, $b_4$ applied to the other input indicate that the amplitude of $Z_{1i}(n)$ and $Z_{2i}(n)$ is equal or not equal to zero. It is easy to see that at the output of AND-gates 137, 138 the increments $I_{nc1}$ and $I_{nc2}$ of the coefficients are obtained which are added by means of adders 210, 211 to the coefficients present in registers 206, 207.

For simplicity the digital arrangement of FIG. 12 is described as it would function for computing the digital samples $\hat{y}(n)$ of the echo copy signal at instant $t_{nk} = nT + kT/q$, characterized by a given value of n and k. Just as the digital arrangement shown in FIG. 4 the arrangement of FIG. 12 actually comprises registers 206, 207 of a sufficient length for storing Lq filter coefficients and, consequently, suitable for successively computing the q samples $\hat{y}_k(n)$ at instants $t_{nk}$ which, at a given value of n, are characterized by values of k between 0 and $(q-1)$. Finally, it appears from the considered modulation example that the digital arrangement of FIG. 12 enables the computation of a sample $\hat{y}_k(n)$ by performing per instant $t_{nk}$ only one "complicated" multiplication by $\sqrt{2}/2$ in multiplier 126, whereas the coefficients are adjusted by performing only one "complicated" multiplication by $\sqrt{2}/2$ in multiplier 131.

In the majority of the practical modulation cases, the assembly of the two adaptive filters can be construed in the second implementation of the echo canceler by utilizing a technique of the same type as that just described in order to perform per unit of time only a minimum of "complicated" multiplications.

In a further example of octonary phase modulation without amplitude modulation, in which the symbol rate 1/T is equal to 1600 Hz and the carrier frequency $f_o$ is equal to 1700 Hz it can be proved that the number of phases $\theta_{ij}$ is equal to 16. In the digital implementation of the assembly of the two filters $F_1$ and $F_2$ it can then be achieved (by applying the coefficients of the filters, multiplied by +1, −1 or 0, in a suitable manner to the accumulators) that for each instant $t_{nk}$ only three "complicated" multiplications need be performed, namely a multiplication by $\sqrt{2}/2$, one by cos $\pi/8$ and one by sin $\pi/8$.

It should be noted that this technique is particularly suitable for implementing the adaptive digital filters in the second embodiment of the present echo canceler, because the numbers to be processed in the two filters $F_1$ and $F_2$ have values of the form $A_{ir}\cos\theta_{ij}$ and $A_{ir}\sin\theta_{ij}$ and, consequently, may be complicated. However, it will be obvious to one skilled in the art that the same technique can be used with advantage in the implementation of the assembly of the filters $F_{ij}$ in the first embodiment of the echo canceler if they are used for a modulation with different amplitudes $A_{ir}$, which have no simple mutual ratios.

In that case of the first implementation of the present echo canceler the amplitude $A_{ir}$ (always positive) of the carrier will of course be coded by means of a coding circuit which is common to all filters $F_{ij}$. Each filter $F_{ij}$ will then comprise a register for the L input numbers $X_{ij}(n)$ and a register for the filter coefficients. On the contrary, the assembly of the filters $F_{ij}$ will advantageously make a common use of the same accumulators, which are each characterized by a given carrier amplitude, whereas the numbers present in these accumulators will be multiplied once in each instant $t_{nk}$ by the corresponding carrier amplitudes. The products thus formed will then be added for forming the echo copy signal.

What is claimed is:

1. A digital echo canceler for a modem for data transmission by means of modulation of a carrier by symbols derived from the binary data to be transmitted and occurring at instant iT, where i is a variable integer and 1/T the symbol rate, the transmitter and the receiver of this modem being connected to the transmission line through a hybrid coupler, the echo canceler receiving the binary data to be transmitted and supplying an echo copy signal which is adjusted in an adaptive manner for reducing an error signal formed by the difference between the modulated carrier signal received from the hybrid coupler and the echo copy signal, said echo canceler comprising an assembly of adaptive digital filters, means responsive to each symbol configuration at each instant iT for generating at least a signal representing a number depending on the amplitude allotted to the carrier at said instant iT and for applying said number signal to at least a given section of said assembly of adaptive digital filters, said filters providing output signals, means for combining said output signals for forming a digital version of the echo copy signal, an assembly of adjusting circuit means for receiving said error signal in digital form and for minimizing a predetermined function of said error signal and for adjusting the coefficients of said filters.

2. An echo canceler as claimed in claim 1 for a modem for data transmission by means of N-ary phase modulation which can be combined with amplitude modulation, the ratio between carrier frequency $f_o$ and symbol rate 1/T having the form P/Q and P and Q being integers, wherein said generating and applying means in the echo canceler are arranged for applying the generated number signal having the amplitude value allotted to the carrier at said instant iT to a given adaptive digital filter of said filter assembly in accordance with the phase $\theta_{ij}$ of the modulated carrier at said instant iT, said phase $\theta_{ij}$ being the sum of one of the phases $\phi_{ij}$ allotted to the carrier as a function of the data, and of the phase of the unmodulated carrier assuming Q different values within an angle of 2 $\pi$ radians.

3. An echo canceler as claimed in claim 2, wherein the generating and applying means comprises first and second switching circuit means, said first switching circuit means having N positions and being controlled in accordance with the phase $\phi_{ij}$ allotted to the carrier at said instant iT as a function of the data for applying the number signal having the amplitude value allotted to the carrier to said second switching circuit means, said second switching circuit means comprising an assembly of N second switching circuits having Q positions, said assembly of second switching circuits being controlled so that at each instant iT all second switching circuits switch over simultaneously from a given position to the next position and said number signal being applied with the amplitude value allotted to the carrier to said given adaptive digital filter of said filter assemly.

4. An echo canceler as claimed in claim 2, wherein said generating and applying means comprises a switching circuit means controlled in accordance with the phase $\theta_{ij}$ allotted to the modulated carrier at said instant iT for applying the number signal having the amplitude value allotted to the carrier to said given adaptive digital filter of said filter assembly.

5. An echo canceler as claimed in claim 2 for a modem in which the N phases $\phi_{ij}$ allotted to the carrier as a function of the data are spaced at a regular phase distance, wherein the number of adaptive digital filters in said filter assembly is equal to the least common multiple of N and Q.

6. An echo canceler as claimed in claim 2, for a modem in which a first group of phases $\theta_{ij}$ of the modulated carrier differs an amount of $\pi$ radians from a second group of phases $\theta_{ij}$, wherein said generating and applying means apply the number signals having the amplitude values allotted to the carrier to a same adaptive digital filter of said filter assembly for each pair of phases $\theta_{ij}$ having a phase difference of $\pi$ radians, and said generating and applying means include means for changing the sign of these number signals for the phases in a given group of said first and second groups of phases $\theta_{ij}$ before applying these number signals to this adaptive digital filter.

7. An echo canceler as claimed in claim 6 for a modem in which the N phases $\phi_{ij}$ allotted to the carrier as a function of the data are spaced at a regular phase distance, wherein the number of adaptive digital filters in said filter assembly is equal to half the least common multiple of N and Q.

8. An echo canceler as claimed in claim 2 for a modem in which said ratio P/Q is of the form p/2 or (2p+1)/4 and p is an integer, said generating and applying means provide the number signal having the amplitude value allotted to the carrier at each instant iT with a sign depending on the function $(-1)^{pi}$ and apply this number signal to a given adaptive digital filter of said filter assembly in accordance with the phase $\phi_{ij}$ allotted to the carrier as a function of the data.

9. An echo canceler as claimed in claim 8, characterized in that the number of adaptive digital filters in said filter assembly is equal to N.

10. An echo canceler as claimed in claim 8, for a modem in which the N phases $\phi_{ij}$ allotted to the carrier as a function of the data are divided into a first and a second group each having N/2 phases and the phases in the second group have a phase difference of $\pi$ radians relative to the phases in the first group, wherein the number of adaptive digital filters in said filter assembly is equal to N/2 and each filter in said filter assembly corresponds to a given pair of phases $\phi_{ij}$ having a phase difference of $\pi$ radians, said means changing the sign of the number signals to be applied to the filters in said filter assembly for the phases in a given group of said first and second group of phases $\phi_{ij}$.

11. An echo canceler as claimed in claim 1, for a modem for data transmission by means of N-ary phase modulation which can be combined with amplitude modulation, the ratio between carrier frequency $f_o$ and symbol rate 1/T having the form P/Q and P and Q being integers, wherein said assembly comprises a first and a second adaptive digital filter, said generating and applying means being responsive to the values of the amplitude-phase pair $(A_{ir}, \theta_{ij})$ of the modulated carrier at each instant iT for generating two number signals representing $A_{ir} \cos \theta_{ij}$ and $A_{ir} \sin \theta_{ij}$ respectively, and applying said last recited number signals to said first and second adaptive digital filters respectively.

12. An echo canceler as claimed in claim 11, for a modem in which said ratio P/Q is of the form p/2 or (2p+1)/4 and p is an integer, said generating and applying means comprise means for forming the number signals to be applied to the first and the second adaptive digital filters including means for generating at each instant iT two number signals representing $A_{ir} \cos \phi_{ij}$ and $A_{ir} \sin \theta_{ij}$ respectively in accordance with the phase $\phi_{ij}$ allotted to the carrier as a function of the data and for providing these two generated number signals with a sign depending on the function $(-1)^{pi}$.

13. An echo canceler as claimed in claim 11, wherein said generating and applying means comprises a memory means for storing the possible values of the number signals to be applied to the first and second adaptive digital filters, and means for reading said memory means at each instant iT under the control of the values of the amplitude-phase pair of the carrier at each instant iT.

14. An echo canceler as claimed in claim 1, wherein each adaptive digital filter comprises means for forming a sample $$g_k(n) = \sum_{i=1}^{L} Z_i(n) \cdot G_{ik}(n)$$

at each sampling instant $$t_{nk} = nT + kT/q$$

n being an integer between $-\infty$ and $+\infty$ and k an integer between 0 and (q−1), $Z_i(n)$ being input numbers of this filter at instants (n−i)T and $G_{ik}(n)$ filter coefficients corresponding to samples of the filter impulse response at instants (n−i)T+kT/q, this filter further comprising memory means for storing said numbers $Z_i(n)$ and said filter coefficients $G_{ik}(n)$, said numbers being derived from these memories during a computing interval T/q allotted to said instant $t_{nk}$.

15. An echo canceler as claimed in claim 14, wherein each adaptive digital filter comprises the following elements:
 a circuit means for coding the numbers $Z_i(n)$ and for generating their sign and their absolute value in coded form,
 a circuit means controlled by the generated sign of the numbers $Z_i(n)$ for changing the sign of the filter coefficients $G_{ik}(n)$ in case the signs of $Z_i(n)$ and $G_iK(n)$ are different,
 an assembly of accumulators each individually corresponding to a given absolute value $Z_i(n)$, said accumulator being reset to zero at the beginning of each computing interval T/q,
 switching means controlled by the absolute value for the numbers $Z_i(n)$ generated in coded form for applying the filter coefficient thus obtained with associated sign to a given accumulator of said assembly of accumulators,
 multiplying circuits means for forming at the end of each computing internval T/q a product of the number in each accumulator with the absolute value associated with this accumulator, and
 an adding circuit means for combining said products for forming the desired sample $g_k(n)$.

16. An echo canceler as claimed in claim 15, wherein said accumulator assembly and said multiplying circuits are common for all adaptive digital filters in said filter assembly and an adder circuit common to all of said filters combines said products for forming a sample of the echo copy signal.

17. An echo canceler as claimed in claim 16, wherein said generating and applying means comprises means for forming at each instant iT a number signal $W_{irj}$ characteristic of the values of the amplitude-phase pair of the carrier at this instant iT, a circuit means common to said first and second adaptive filter for coding said number signals $W_{irj}$ so as to generate simultaneously in coded form the sign and the absolute value of the input numbers of both adaptive filters, and a memory means for storing the coded numbers $W_{irj}$.

18. An echo canceler as claimed in claim 14, wherein said filter assembly comprises means for changing for each adaptive digital filter the L filter coefficients $G_{ik}(n)$ at an instant $t_{nk}$ for obtaining the L filter coefficients $G_{ik}(n+1)$ at an instant $t_{(n+1)k}$ in accordance with a recursion equation:

$$G_{ik}(n+1) = G_{ik}(n) + \mu \cdot E_k(n) \cdot Z_i(n)$$

$\mu$ being a fixed coefficient having a value smaller than 1 and $E_k(n)$ being the value of the error signal at said instant $t_{nk}$.

* * * * *